US012548906B2

(12) United States Patent
Aviv et al.

(10) Patent No.: US 12,548,906 B2
(45) Date of Patent: Feb. 10, 2026

(54) PATCH ANTENNA AND DUAL-BAND INTERLEAVED ARRAY WITH PASSIVE ELEMENT

(71) Applicant: QUALCOMM Incorporated, San Diego, CA (US)

(72) Inventors: Assaf Aviv, Carlsbad, CA (US); Jeongil Jay Kim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 18/340,770

(22) Filed: Jun. 23, 2023

(65) Prior Publication Data

US 2024/0429610 A1 Dec. 26, 2024

(51) Int. Cl.

*H01Q 9/04* (2006.01)
*H01Q 5/40* (2015.01)
*H01Q 21/08* (2006.01)

(52) U.S. Cl.

CPC ............. *H01Q 9/0407* (2013.01); *H01Q 5/40* (2015.01); *H01Q 21/08* (2013.01)

(58) Field of Classification Search

CPC .. H01Q 9/0407; H01Q 9/0414; H01Q 9/0464; H01Q 5/30; H01Q 5/378; H01Q 5/385; H01Q 5/392; H01Q 5/40; H01Q 5/42; H01Q 21/06; H01Q 21/065; H01Q 21/08; H01Q 21/10; H01Q 21/12; H01Q 21/24

See application file for complete search history.

(56) References Cited

U.S. PATENT DOCUMENTS 7,932,870 B2 * 4/2011 Baliarda ................ H01Q 21/30 343/844
8,269,687 B2 * 9/2012 Lindmark ............ H01Q 21/061 343/893
11,011,827 B2 * 5/2021 Thai ........................ H01Q 1/243
11,349,204 B2 * 5/2022 Wu ......................... H01Q 1/523
11,894,608 B2 * 2/2024 Wu ....................... H01Q 19/005
2012/0280878 A1 * 11/2012 Timofeev ............... H01Q 1/246 343/793

(Continued)

OTHER PUBLICATIONS

International Search Report and Written Opinion—PCT/US2024/032752—ISA/EPO—Oct. 11, 2024.

*Primary Examiner* — Jason M Crawford

(74) *Attorney, Agent, or Firm* — Smith Tempel Blaha LLC/Qualcomm Incorporated

(57) ABSTRACT

A patch antenna array includes a plurality of high-band patch antennas configured to radiate at frequencies in a relatively higher frequency band; and a plurality of low-band patch antennas configured to radiate at frequencies in a relatively lower frequency band, the low-band patch antennas interleaved with the high-band patch antennas. Each low-band patch antenna includes: an active element; and a passive element comprising a metal ring with an outer edge and an inner edge, the inner edge defining an inner opening. A corresponding patch antenna includes an active rectangular patch element; and a passive element disposed above the active element with a metal ring defining an inner opening, wherein the passive element is disposed above the active element. The passive, metal ring elements can optimize the dual-band performance by controlling interference. Very narrow substrates can be enabled.

20 Claims, 13 Drawing Sheets

(56) References Cited

U.S. PATENT DOCUMENTS

| | | | | |
|---|---|---|---|---|
| 2019/0020110 | A1* | 1/2019 | Paulotto | H01Q 5/392 |
| 2019/0267713 | A1* | 8/2019 | Jeong | H01Q 9/065 |
| 2020/0021037 | A1* | 1/2020 | Wu | H01Q 9/0457 |
| 2020/0106158 | A1* | 4/2020 | Gomez Angulo | G06F 1/1698 |
| 2020/0106183 | A1* | 4/2020 | Fabrega Sanchez | H04B 1/0458 |
| 2020/0194889 | A1 | 6/2020 | Hallivuori | |
| 2021/0242591 | A1 | 8/2021 | Kim et al. | |
| 2022/0006191 | A1* | 1/2022 | Shibata | H01Q 5/307 |
| 2022/0045442 | A1* | 2/2022 | Fabrega Sanchez | H01Q 5/42 |
| 2022/0094075 | A1* | 3/2022 | Kim | H01Q 5/307 |
| 2022/0123470 | A1* | 4/2022 | Kim | H01Q 1/523 |
| 2022/0328978 | A1* | 10/2022 | Sudo | H01Q 1/2283 |
| 2022/0393351 | A1* | 12/2022 | Wu | H01Q 21/30 |
| 2023/0019565 | A1 | 1/2023 | Evtyushkin et al. | |
| 2023/0327335 | A1* | 10/2023 | Park | H01Q 21/065 342/372 |
| 2024/0429610 | A1* | 12/2024 | Aviv | H01Q 5/378 |
| 2024/0429611 | A1* | 12/2024 | Aviv | H01Q 5/364 |
| 2025/0132505 | A1* | 4/2025 | Ramabadran | H01Q 25/001 |

* cited by examiner

PATCH ANTENNA AND DUAL-BAND INTERLEAVED ARRAY WITH PASSIVE ELEMENT

BACKGROUND

A wireless device (e.g., a cellular phone or a smart phone) may include a transmitter and a receiver coupled to an antenna to support two-way communication. The antenna may be enclosed within a housing assembly (e.g., cover) based on portability and aesthetics design considerations. In general, the transmitter may modulate a radio frequency (RF) carrier signal with data to obtain a modulated signal, amplify the modulated signal to obtain an output RF signal having the proper power level, and transmit the output RF signal via the antenna to a base station. For data reception, the receiver may obtain a received RF signal via the antenna and may condition and process the received RF signal to recover data sent by the base station. As the radio frequency used by the wireless device increases, the complexity of the RF transmitting circuitry also increases. To facilitate and/or enable wireless signal applications, numerous types of antennas have been developed, with different antennas used based on the needs of an application, e.g., distance, frequency, operational frequency bandwidth, antenna pattern beam width, gain, beam steering, etc. Newer RF technologies and wireless devices are becoming more reliant on dual-band performance.

SUMMARY

An example patch antenna array according to the disclosure includes a plurality of high-band patch antennas configured to radiate, when electrically driven, at frequencies in a relatively higher frequency band; and a plurality of low-band patch antennas configured to radiate, when electrically driven, at frequencies in a relatively lower frequency band, the plurality of low-band patch antennas disposed in an interleaved arrangement; wherein each patch antenna of the plurality of low-band patch antennas includes: an active element; and a passive element comprising a metal ring with an outer edge and an inner edge, the inner edge defining an inner opening.

In implementations, the patch antenna array can have various other features including the following example features. In each patch antenna of the plurality of low-band patch antennas, the passive element may be disposed above the active element, and the outer edge of the metal ring may have an overlap with an outer edge of the active element. The patch antenna array may further include a substrate on which the pluralities of high-band and low-band patch antennas are disposed, wherein adjacent high-band and low-band antennas of the patch antenna array are situated along a long axis of the patch antenna array. Adjacent high-band and low-band antennas of the patch antenna array may be situated along the long axis with center-to-center separation in a range of about 4.0 mm to about 6.0 mm. The patch antenna array may further include a plurality of peripheral, passive, metallic elements disposed around an outer edge of the active element, wherein the plurality of peripheral, passive, metallic elements may be electrically isolated from the active element and from each other. The plurality of peripheral, passive, metallic elements may include four or eight peripheral, passive, metallic elements. The inner edge defining the inner opening of the metal ring of each of the low-band patch antennas may be sized to suppress radiation, of the respective low-band patch antenna, at the relatively higher frequency band. The inner edge defining the inner opening of the metal ring of each of the low-band patch antennas may be a square edge, and a length of each square edge may be approximately matched to a size of active elements of each of the plurality of high-band patch antennas. The inner edge defining the inner opening of the metal ring of each of the low-band patch antennas may be a square edge, and each square edge may be larger than a length of active elements of each of the plurality of high-band patch antennas. The inner edge defining the inner opening of the metal ring of each of the low-band patch antennas may be a circular edge, and a diameter of the circular edge may be approximately matched to a length of active elements of each of the plurality of high-band patch antennas. The inner edge defining the inner opening of the metal ring of each of the low-band patch antennas may be a circular edge, and a diameter of the circular edge may be larger than a length of active elements of each of the plurality of high-band patch antennas. The outer edge of the metal ring may may be in perfect lateral alignment with an outer edge of the active element. The plurality of high-band patch antennas, the plurality of low-band patch antennas, or both may be further configured to radiate with dual polarizations. The active element of each low-band patch antenna of the plurality of low-band patch antennas may be a rectangular patch. Each rectangular patch may be square patch, the outer edge of the square patch defining four equilateral sides of the square patch. The inner edge of the metal ring of each passive element may be an inner square edge. Each outer edge may be a circular outer edge. The inner edge of each metal ring may be a circular inner edge. The active element and the passive element of each patch antenna of the plurality of low-band patch antennas may be arranged to enable the patch antenna, when electrically driven, to radiate in a band having a peak gain in a range of 24.25-29.5 GHZ. The pluralities of high-band and low-band patch antennas may be disposed on a substrate having a width less than 3.2 mm. The substrate width may further be less than or equal to 3.0 mm.

An example patch antenna according to the disclosure includes an active element comprising a rectangular patch having an outer edge. The example patch antenna further includes a passive element comprising a metal ring with an outer edge and an inner edge, the inner edge defining an inner opening, wherein the passive element is disposed above the active element, and wherein the outer edge of the metal ring has an overlap with an outer edge of the rectangular patch.

In implementations, such a patch antenna can include various features such as the following. The rectangular patch can be a square patch, the outer edge of the square patch defining four equilateral sides of the square patch. Each of the four equilateral sides of the square patch can have a length of about 1.65 mm. The outer edge of the metal ring can be an outer square edge. Each side of the outer square edge can have a length of about 1.65 mm. The inner edge of the metal ring is an inner square edge. Each side of the inner square edge can have a length of about 1.0 mm. The outer edge of the metal ring can be a circular outer edge. The outer circular edge can have a diameter of approximately 1.65 mm. The inner edge of the metal ring can be a circular inner edge. The circular inner edge can have a diameter of about 1.0 mm. The patch antenna can further include a plurality of peripheral, passive, metallic elements disposed around the outer edge of the rectangular patch, wherein the plurality of peripheral, passive, metallic elements can be electrically isolated from the rectangular patch and from each other. The plurality can include four or eight peripheral, passive, metallic elements. The patch antenna can have a layer of dielectric material disposed between the active element and the passive element. A dielectric constant $D_k$ of the dielectric material can be in a range of about 5.0 to 9.8. The dielectric constant $D_k$ of the dielectric material can be in a range of about 9.0 to 9.8. A further range of the $D_k$ of about 4.4 to about 6.4 applies in some embodiments. More generally, $D_k$ can be in a range about 3.0 to about 12 in various embodiments. More particular embodiments include the dielectric material having a value of $D_k$ of about 5.4 or about 9.4. The active and passive elements can be arranged to enable the patch antenna, when electrically driven, to radiate in a band having a peak gain in a range of 24.25-29.5 GHZ. The patch antenna can be configured to radiate in a frequency band, and the inner edge defining the inner opening can be sized to suppress production of radiation, by the patch antenna, at a second harmonic of the frequency band. The patch antenna can further form part of a patch antenna array. The patch antenna array can be disposed on a substrate having a width dimension less than 3.2 mm. The width dimension can be less than or equal to 3.0 mm. Furthermore, the plurality of low-band patch antennas may have various features described above in connection with the example patch antenna. Various exemplifications of this are provided in the detailed description, and other exemplifications will become apparent from the detailed description.

A further example patch antenna array according to the disclosure includes a plurality of high-band patch antennas configured to radiate, when electrically driven, at frequencies in a relatively higher frequency band; and a plurality of low-band patch antennas configured to radiate, when electrically driven, at frequencies in a relatively lower frequency band, the plurality of low-band patch antennas disposed in an interleaved arrangement with the plurality of high-band patch antennas, along a long axis of the patch antenna array; wherein the pluralities of high-band and low-band patch antennas are disposed on a substrate having a width less than 3.2 mm. In various implementations, the substrate width can be less than or equal to 3.0 mm. Furthermore, the patch antenna array may have any of the features described above in connection with the example patch antenna array and the example patch antenna.

Items and/or techniques described herein may provide one or more of the following capabilities, as well as other capabilities not mentioned. A patch antenna having an active patch element and configured to operate in a particular frequency band may be provided with a passive, metal ring element placed parallel to the active patch element. The passive, metal ring element can be configured to reduce, substantially, interference that the patch antenna may otherwise cause with another patch antenna operating in a different frequency band. The benefits of the passive, metal ring element may extend to patch antenna arrays. A plurality of patch antennas may be disposed on a substrate. Some of the patch antennas can be designated as high-band patch antennas and be configured to emit millimeter-wave (MMW) radiation in a relatively higher-frequency band. Others of the patch antennas in the array may be designated as low-band patch antennas, each configured to emit MMW radiation in a relatively lower-frequency band, and each including the passive, metal ring element noted above. The configuration of the low-band patch antennas in the array may enable the high-band patch antennas to operate substantially without interference from the low-band patch antennas. A further result and feature that can be enabled by the noted passive, metal ring elements and related use in low-band patch antennas is to facilitate narrower multiband (e.g., dual-band) patch antenna arrays that are suitable for use in edges of cell phones that are being required to be increasingly thin. Other capabilities may be provided, and not every implementation according to the disclosure must provide any, let alone all, of the capabilities discussed. Further, it may be possible for an effect noted above to be achieved by means other than that noted, and a noted item/technique may not necessarily yield the noted effect.

Figure 1:
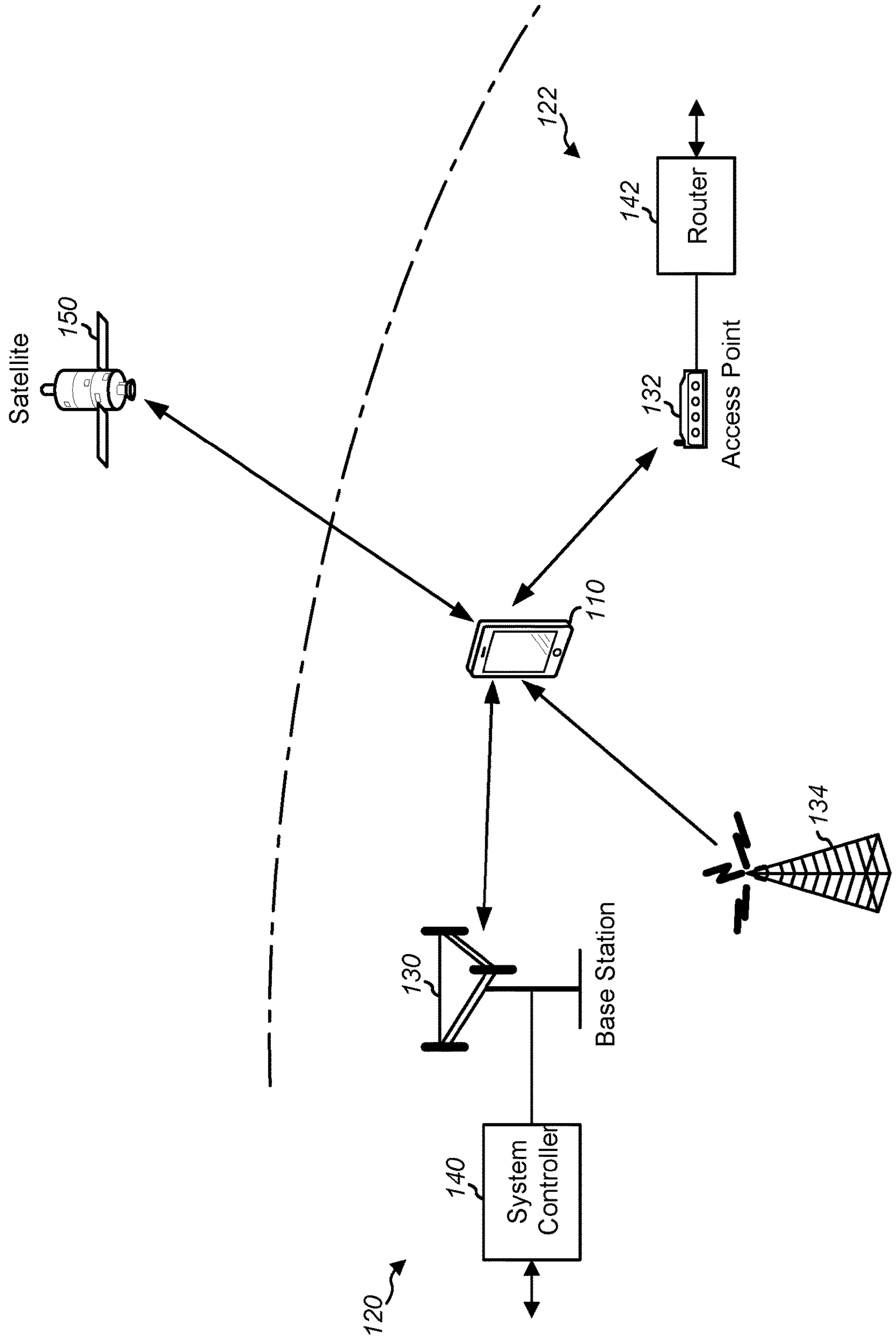
FIG. 1 shows a wireless device capable of communicating with different wireless communication systems.

The foregoing will be apparent from the following more particular description of example embodiments, as illustrated in the accompanying drawings, in which like reference characters refer to the same parts throughout the different views. The drawings are not necessarily to scale, emphasis instead being placed upon illustrating embodiments.

DETAILED DESCRIPTION

This disclosure generally relates to the design of patch antennas. Particular patch antennas consistent with the disclosure can have special advantages when incorporated into dual-band patch antenna arrays, and more especially in dual-band interleaved patch antenna arrays. Embodiments can be used in 5G MMW antenna modules. Nonetheless, embodiments can be useful more generally to improve multiband aperture shared interleaved MMW antenna arrays.

Millimeter-wave (MMW) 5G antenna modules are being integrated within wireless user devices such as cell phones. It is very desirable to maximize the coverage radiated performance of the modules within the limited volume available in a wireless device. Thus, as one aspect of a solution to the coverage problem, cell phones typically integrate a few of these MMW modules to provide the best possible coverage in all surrounding directions.

Various other design constraints are also arising. For example, band support requirements for these antenna modules continue to increase as more bands are being auctioned and made available. Accordingly, there is the need to find solutions that enable the new bands, in addition to the legacy bands, within the same user devices. Moreover, thinner cell phones are being sought by cell phone customers, resulting in a need for narrower MMW modules, such as including substrates having width less than or equal to 3.2 millimeters (<=3.2 mm). In one example, because of this size constraint, some quad-fed patch antenna arrays may use dielectric material of higher dielectric constant $D_k$ to reduce the physical size of a substrate incorporating the dielectric material. Some drawbacks of higher $D_k$, quad-fed patch antenna array designs, however, may include various issues such as narrower bandwidth, a tendency toward higher coupling between bands, and limitations on the ability to optimize low-band and high-band patch antenna elements separately.

Alternatively, a multiband phased array configuration can be used in a patch antenna array with low-band and high-band patch antenna elements interleaved. In a multiband interleaved array, each band has its own element. In other words, different, respective patch antennas are used for respective bands. Interleaved patch antenna arrays have an advantage over quad-fed patch arrays in terms of expanding bandwidth and optimizing each low-band and high-band element separately.

However, it has been found that interleaved arrays can have poor scanning performance at high-band due to coupling and radiation between elements. Driving high-band patch antenna elements can result in significant excitation of low-band elements, given overlap of the high-band radiation with a second harmonic of the low-band elements' gain band.

Embodiments described herein provide a new patch antenna design for an interleaved antenna array to improve array performance and scanning. A new patch antenna design described herein can be used, by way of example, for a relatively lower-frequency band in a multiband interleaved antenna array. Embodiments can improve array performance and scanning, in part because high-band (band 2) patch antennas in the array can radiate with substantially reduced interference from corresponding low-band (band 1) patch antennas in the array. In this way, a multiband patch antenna array having two or more bands, such as a dual-band array, can exhibit better scanning performance, increasing coverage of an embodiment dual-band patch antenna array.

As used herein, "low band" (or "relatively lower band") and "high band" (or "relatively higher band") refer to respective bands of relatively lower-frequency and relatively higher-frequency gain regions in a multiband patch antenna array such as a dual-band patch antenna array. Consistently, one example low band that can be used in embodiments is centered in a range of 24.25-29.5 GHZ (also referred to herein as the 28 GHz band), and one example high band that can be used in embodiments is centered in a range of 37-43.5 GHZ (also referred to herein as the 39 GHz band). However, embodiments are not limited to these bands. Further, embodiments are also not limited to only two bands, but may be more generally multiband, having two or more bands provided by two or more patch antennas.

As used herein, "rectangular" encompasses the special case of a "square," with "square" denoting four substantially equilateral sides oriented with adjacent sides being at right angles with respect to one another.

As used herein, a "ring" is a shape, with one or more curved or straight sides, encompassing an inner opening. Examples of a "ring" as used herein include symmetric and asymmetric rings. Certain examples include ellipses, circles, ovals, rectangles, squares, and other polygons). A "ring" as used herein can have zero, one, two, or more than two axes of symmetry.

As used herein, a second item being "disposed above" a first item denotes that the first and second items are substantially parallel to each other in particular respective planes defined by the respective first and second items and displaced from each other in a direction perpendicular to the particular planes, with at least some overlap of the first and second items when viewed perpendicular to the particular respective planes.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

"About" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

In particular, example length and width measurements are given for embodiment patch antennas and patch antenna arrays herein. In using the term "about" or "approximately" in reference to these measurements, tolerance indicated by these terms can be readily ascertained by those of skill in the art, in view of this description, based on (i) the frequency band to be produced by a given patch, (ii) a degree of need to optimize the center of the frequency band for greatest overall gain in the intended band, and (iii) interaction of the length and width measurements with any other features of the patch antenna itself, or surrounding features, that can affect frequency band.

Referring to FIG. 1, a wireless device 110 capable of communicating with different wireless communication systems 120 and 122 is shown. The wireless system 120 may be a Code Division Multiple Access (CDMA) system (which may implement Wideband CDMA (WCDMA), cdma2000, or some other version of CDMA), a Global System for Mobile Communications (GSM) system, a Long Term Evolution (LTE) system, a 5G system, etc. The wireless system 122 may be a wireless local area network (WLAN) system, which may implement IEEE 802.11, etc. For simplicity, FIG. 1 shows the wireless system 120 including a base station 130 and a system controller 140, and the wireless system 122 including an access point 132 and a router 142. In general, each system may include any number of stations and any set of network entities.

The wireless device 110 may also be referred to as a user equipment (UE), a mobile device, a mobile station, a terminal, an access terminal, a subscriber unit, a station, etc. The wireless device 110 may be a cellular phone, a smart phone, a tablet, a wireless modem, a personal digital assistant (PDA), a handheld device, a laptop computer, a smart book, a netbook, a cordless phone, a wireless local loop (WLL) station, an internet of things (IoT) device, a medical device, a device in an automobile, a Bluetooth device, etc. The wireless device 110 may be equipped with any number of antennas. Multiple antennas may be used to provide better performance, to simultaneously support multiple services (e.g., voice and data), to provide diversity against deleterious path effects (e.g., fading, multipath, and interference), to support multiple-input multiple-output (MIMO) transmission to increase data rate, and/or to obtain other benefits. The wireless device 110 may be capable of communicating with one or more wireless systems 120 and/or 122. The wireless device 110 may also be capable of receiving signals from broadcast stations (e.g., a broadcast station 134). The wireless device 110 may also be capable of communicating with satellites (e.g., a satellite 150), for example receiving signals in one or more global navigation satellite systems (GNSS) and/or transmitting signals to satellites in other systems. Further, the wireless device 110 may be configured to communicate directly with other wireless devices (not illustrated), e.g., without relaying communications through a base station or access point or other network device.

In general, the wireless device 110 may support communication with any number of wireless systems, which may employ any radio technologies such as WCDMA, cdma2000, LTE, 5G, GSM, 802.11, GPS, etc. The wireless device 110 may also support operation on any number of frequency bands.

The wireless device 110 may support operation at a very high frequency, e.g., within millimeter-wave (MMW) frequencies from 30 to 300 gigahertz (GHz) or higher. For example, the wireless device 110 may be capable to operate with dual bands. One such configuration includes the 28 GHz and 39 GHz bands. Other very high frequency (e.g., 5G) bands, such as 60 GHz or higher frequency bands, may also be realized with the wireless device 110 and implemented as one of the dual bands. The wireless device 110 may include an antenna system to support CA operations at MMW frequencies. The antenna system may include a number of antenna elements, with each antenna element being used to transmit and/or receive signals. The terms "antenna" and "antenna element" are synonymous and are used interchangeably herein. Generally, each set of antenna elements may be implemented with a patch antenna or a strip-shaped radiator. A suitable antenna type may be selected for use based on the operating frequency of the wireless device, the desired performance, etc. In an exemplary design, an antenna system may include a number of patch and/or strip-type antennas supporting operation at MMW frequencies.

Figure 2:
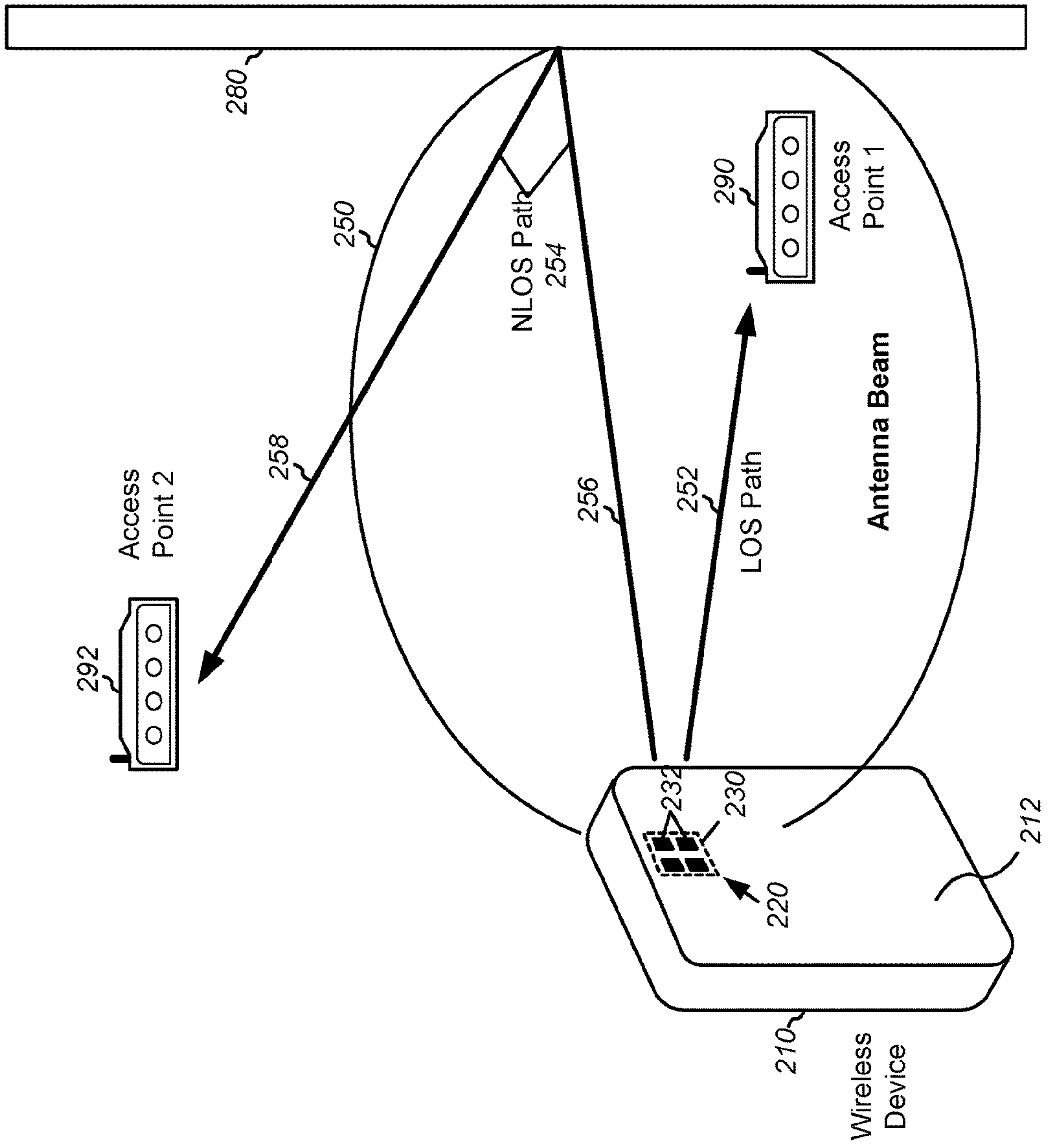
FIG. 2 shows a wireless device with a 2-dimensional (2-D) antenna system.

Referring to FIG. 2, an exemplary design of a wireless device 210 with a 2-D antenna system 220 is shown. In this exemplary design, antenna system 220 includes a 2×2 array 230 of four patch antennas 232 (i.e., radiators) formed on a single geometric plane corresponding to a back surface of wireless device 210 (e.g., a backside array). Those of skill in the art will understand that other array configurations may be utilized. For example, a 1×4 array may be used or an array with a greater number of columns and/or rows may be used.

While the antenna system 220 is visible in FIG. 2, in operation the patch array may be disposed on a PC board, antenna carrier, or other assembly located on an inside surface of a device or cover 212. The patch antenna array 230 has an antenna beam 250, which may be formed to point in a direction that is orthogonal to the plane on which patch antennas 232 are formed or in a direction that is within a certain angle of orthogonal, for example up to 60 degrees in any direction from orthogonal. Wireless device 210 can transmit signals directly to other devices (e.g., access points) located within antenna beam 250 and can also receive signals directly from other devices located within antenna beam 250. Antenna beam 250 thus represents a line-of-sight (LOS) coverage of wireless device 210.

An antenna element may be formed on a plane corresponding to a surface of a wireless device and may be used to transmit and/or receive signals. The antenna element may have a particular antenna beam pattern and a particular maximum antenna gain, which may be dependent on the design and implementation of the antenna element. Multiple antenna elements may be formed on the same plane and used to improve antenna gain. Higher antenna gain may be especially desirable at MMW frequency since (i) it is difficult to efficiently generate high power at MMW frequency and (ii) attenuation loss may be greater at MMW frequency.

For example, an access point 290 (i.e., another device) may be located inside the LOS coverage of wireless device 210. Wireless device 210 can transmit a signal to access point 290 via a line-of-sight (LOS) path 252. Another access point 292 may be located outside the LOS coverage of wireless device 210. Wireless device 210 can transmit a signal to access point 292 via a non-line-of-sight (NLOS) path 254, which includes a direct path 256 from wireless device 210 to a wall 280 and a reflected path 258 from wall 280 to access point 292.

In general, the wireless device 210 may transmit a signal via a LOS path directly to another device located within antenna beam 250, e.g., as shown in FIG. 2. Ideally, this signal may have a much lower power loss when received via the LOS path. The low power loss may allow wireless device 210 to transmit the signal at a lower power level, which may enable wireless device 210 to conserve battery power and extend battery life.

The wireless device 210 may transmit a signal via a NLOS path to another device located outside of antenna beam 250, e.g., as also shown in FIG. 2. This signal may have a much higher power loss when received via the NLOS path, since a large portion of the signal energy may be reflected, absorbed, and/or scattered by one or more objects in the NLOS path. Wireless device 210 may transmit the signal at a high power level in an effort to ensure that the signal can be reliably received via the NLOS path.

Figure 3:
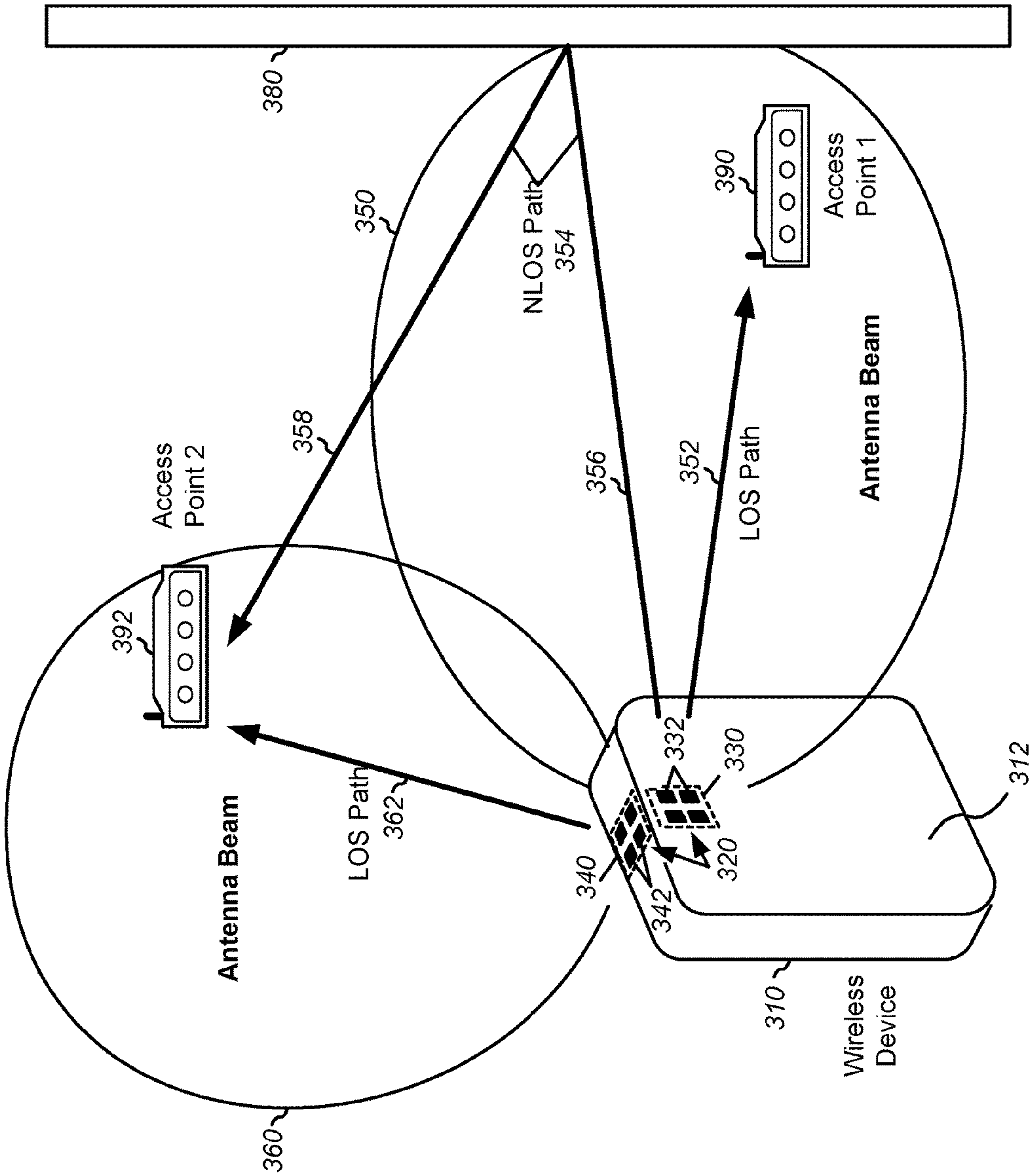
FIG. 3 shows a wireless device with a 3-dimensional (3-D) antenna system.

Referring to FIG. 3, an exemplary design of a wireless device 310 with a 3-D antenna system 320 is shown. In this exemplary design, antenna system 320 includes (i) a 2×2 array 330 of four patch antennas 332 formed on a first plane corresponding to the back surface of wireless device 310 and (ii) a 2×2 array 340 of four patch antennas 342 formed on a second plane corresponding to the top surface of wireless device 310 (e.g., a device edge or an end-fire array). The patch antenna arrays 330, 340 are disposed on the inside of a device cover 312. The antenna array 330 has an antenna beam 350, which points in a direction that is orthogonal to the first plane on which patch antennas 332 are formed. Antenna array 340 has an antenna beam 360, which points in a direction that is orthogonal to the second plane on which patch antennas 342 are formed. In an example, the arrays 330 and 340 may point in a direction that is within a certain angle of orthogonal, for example up to 60 degrees in any direction from orthogonal. Antenna beams 350 and 360 thus represent the LOS coverage of wireless device 310. While the arrays 330 and 340 are each illustrated as a 2×2 array in FIG. 3, one or both may include a greater or fewer number of antennas, and/or the antennas may be disposed in a different configuration. For example, one or both of the arrays 330 and 340 may be configured as a 1×4, 1×8, 2×4 or other array dimensions.

An access point 390 (i.e., another device) may be located inside the LOS coverage of antenna beam 350 but outside the LOS coverage of antenna beam 360. Wireless device 310 can transmit a first signal to access point 390 via a LOS path 352 within antenna beam 350. Another access point 392 may be located inside the LOS coverage of antenna beam 360 but outside the LOS coverage of antenna beam 350. Wireless device 310 can transmit a second signal to access point 392 via a LOS path 362 within antenna beam 360. Wireless device 310 can transmit a signal to access point 392 via a NLOS path 354 composed of a direct path 356 and a reflected path 358 due to a wall 380. Access point 392 may receive the signal via LOS path 362 at a higher power level than the signal via NLOS path 354.

The wireless device 310 shows an exemplary design of a 3-D antenna system comprising two 2×2 antenna arrays 330 and 340 formed on two planes (e.g., backside and edge or end-fire arrays). In general, a 3-D antenna system may include any number of antenna elements formed on any number of planes pointing in different spatial directions. The planes may or may not be orthogonal to one another. Any number of antennas may be formed on each plane and may be arranged in any formation. The antenna arrays 330, 340 may be formed in an antenna carrier substrate and/or within the device cover 312.

Figure 4:
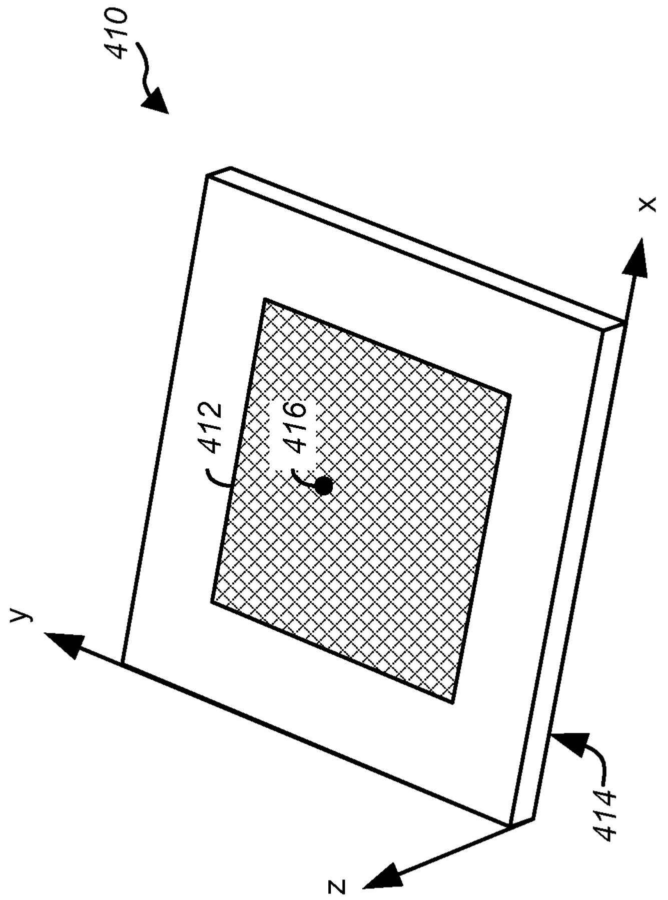
FIG. 4 shows an exemplary design of a patch antenna.

Referring to FIG. 4, an exemplary design of a patch antenna 410 suitable for MMW frequencies is shown. The patch antenna 410 includes a radiator such as a conductive patch 412 formed over a ground plane 414. In an example, the patch 412 has a dimension (e.g., 2.5×2.5 mm) selected based on the desired operating frequency. The ground plane 414 has a dimension (e.g., 4.0×4.0 mm) selected to provide the desired directivity of patch antenna 410. A larger ground plane may result in smaller back lobes. In an example, a feed point 416 is located near the center of patch 412 and is the point at which an output RF signal is applied to patch antenna 410 for transmission. Multiple feed points may also be used to vary the polarization of the patch antenna 410. For example, at least two conductors may be used for dual polarization (e.g., a first conductor and a second conductor may be used for a horizontal-pol feed line and a vertical-pol feed line). The locations and number of the feed points may be selected to provide the desired impedance match to a feedline. Additional patches may be assembled in an array (e.g., 1×2, 1×3, 1×4, 2×2, 2×3, 2×4, 3×3, 3×4, etc. . . . ) to further provide a desired directivity and sensitivity. The ground plane 414 may be disposed under all of the patches in the array.

Figure 5:
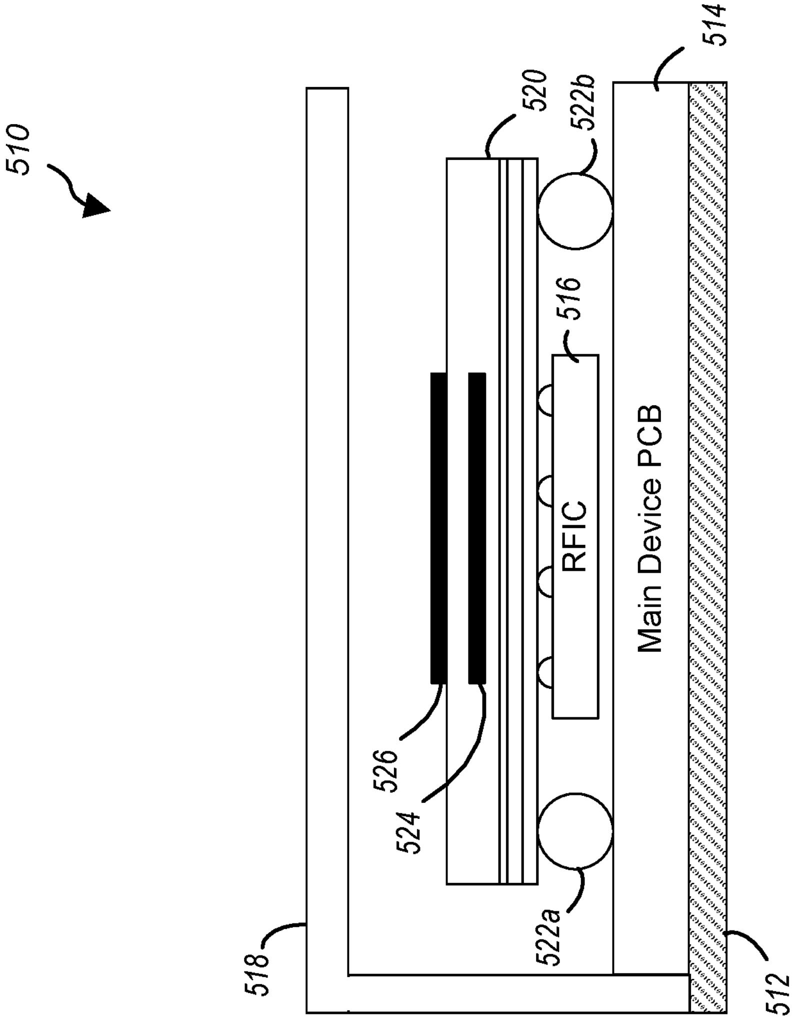
FIG. 5 shows a side view of an example patch antenna array in a wireless device.

Referring to FIG. 5, a side view of an example patch antenna array in a wireless device 510 is shown. The wireless device 510 includes a display device 512, a device cover 518, and a main device printed circuit board (PCB) 514. The main device PCB 514 may be at least one printed circuit board or a plurality of printed circuit boards. In the embodiment illustrated in FIG. 5, a MMW module PCB 520 is operably coupled to the main device PCB 514 via at least one conductor 522*a-b*, which may be configured as one or more ball grid arrays (BGA). The BGA may be configured to enable one or more signals to flow between the MMW module PCB 520 and the main device PCB 514. The MMW module PCB 520 may include at least one patch antenna array 524 and corresponding passive patches 526 to form a wideband antenna. The MMW module PCB 520 also includes signal and ground layers in the illustrated embodiment. At least one radio frequency integrated circuit (RFIC) 516 may be mounted to the MMW module PCB 520 and operated to adjust the power and/or the radiation beam patterns associated with the patch antenna array 524. In some embodiments, the RFIC 516 is also configured to upconvert signals for transmission and/or downconvert received signals. The RFIC 516 may be an example of an antenna controller and may be configured to utilize phase shifters and hybrid antenna couplers to control the power directed to the antenna array and to control the resulting beam pattern. The MMW module PCB 520 is configured in a backside configuration in the embodiment illustrated in FIG. 5 to generate a beam on the back side (i.e., opposite the display 512) of the wireless device 510. In some embodiments, the MMW module PCB 520 is implemented as a substrate configured as a routing layer which is formed separate from one or more of the antennas 524, 526 and coupled to such antennas. For example, each antenna 524 (and optionally including 526) may be formed as a discrete component which is coupled to the routing layer, or several different antennas may be formed together in a common stackup that is coupled to the routing layer. The size, stackup, type of material, type of antenna (e.g., patch or dipole), etc. that forms an antenna portion separate from the PCB 520 may vary between antenna different antenna portions.

Figure 6A:
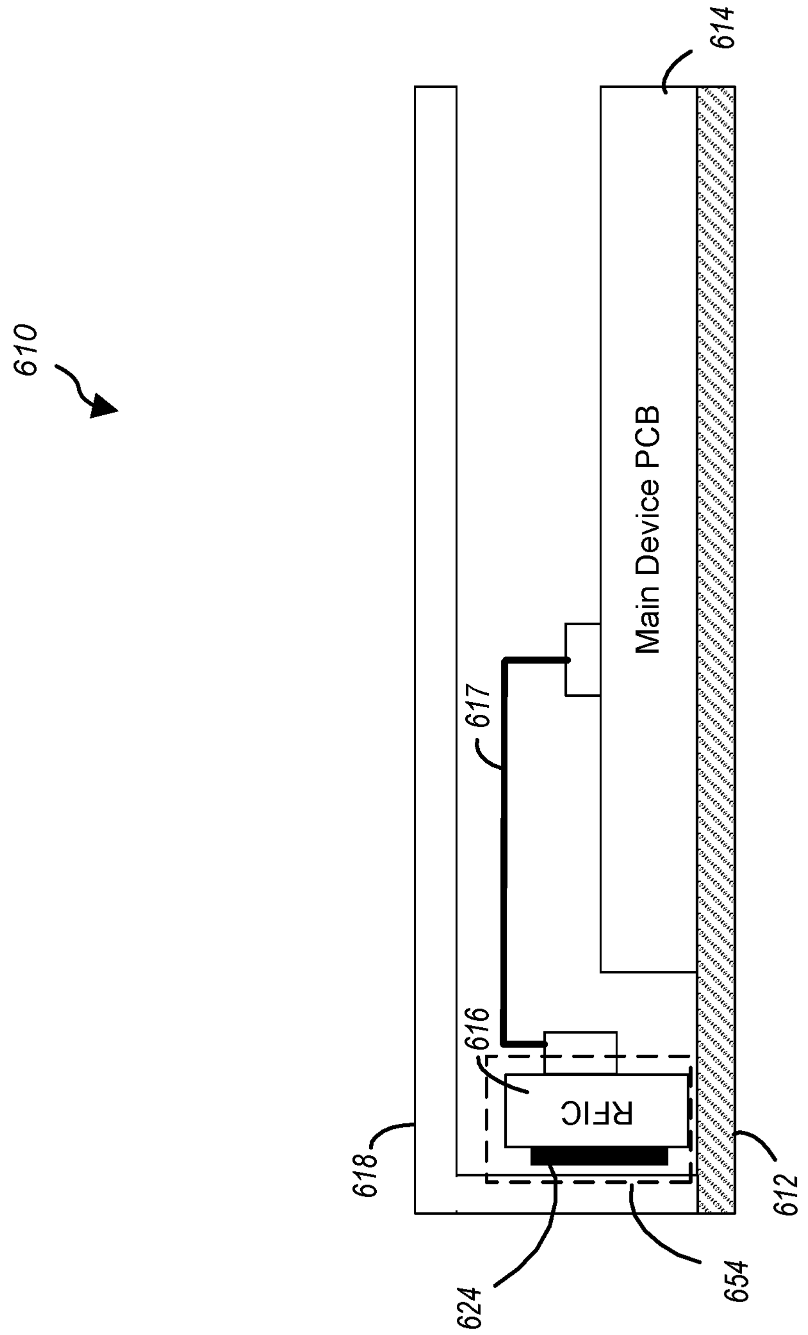
FIG. 6A shows a side view of an example patch antenna array in a wireless device.

Referring to FIG. 6A, a side view of an example patch antenna array in a wireless device 610 is shown. The wireless device 610 includes a display device 612, a device cover 618, and a main device printed circuit board (PCB) 614. The main device PCB 614 may be at least one printed circuit board or a plurality of printed circuit boards. One or more antenna modules 654 may be disposed on the outer edge of the wireless device 610, for example near a top (as illustrated with the array 340 in FIG. 3), bottom, side, or back (not illustrated) of the device 610. Each of the antenna modules 654 may be operably coupled to the main device PCB 614 via one or more cabling assemblies 617. The cabling assemblies may include connectors configured to mate with one or more of the antenna modules 654 and the main device PCB 614. The antenna module 654 includes an antenna array 624 and may include at least one radio frequency integrated circuit (RFIC) 616. The RFIC 616 may be configured to adjust the power and/or the radiation beam patterns associated with the antenna array 624. The RFIC 616 is an example of an antenna controller and may be configured to utilize phase shifters and/or hybrid antenna couplers to control the power directed to the antenna array and to control the resulting beam pattern. In other examples, the antenna array 624 is disposed as illustrated, but is not packaged together with the RFIC 616 in a module. In such examples, the RFIC 616 may be physically and/or operationally coupled to, or integrated with, the main device PCB 614, and coupled to the antenna array 624 via the cable 617. The RFIC 616 may also be disposed away from the main device PCB 614, for example in another portion of an edge of the wireless device 610, and the antenna array 624, RFIC 616, and main device PCB 614 may be daisy chained together by a plurality of cables. Additional antenna modules 654 or antenna arrays may be operably coupled to the main device PCB 614 with one or more cables. While the antenna module 654 is illustrated as being disposed on the outer edge of the device 610 in FIG. 6A, those of skill in the art will appreciate that an antenna module or antenna array may be disposed anywhere in the device. In some implementations of the embodiment illustrated in FIG. 6A, the antenna module or array is configured to emit and/or receive radiation through an edge of the device. For example, emission or reception of radiation can be in a direction that is roughly perpendicular to the portion of the device cover 618 illustrated on the left side of the figure. In some embodiments, one or more antenna modules or arrays are configured to emit and/or receive radiation through a front or back of the device 610.

Figure 6B:
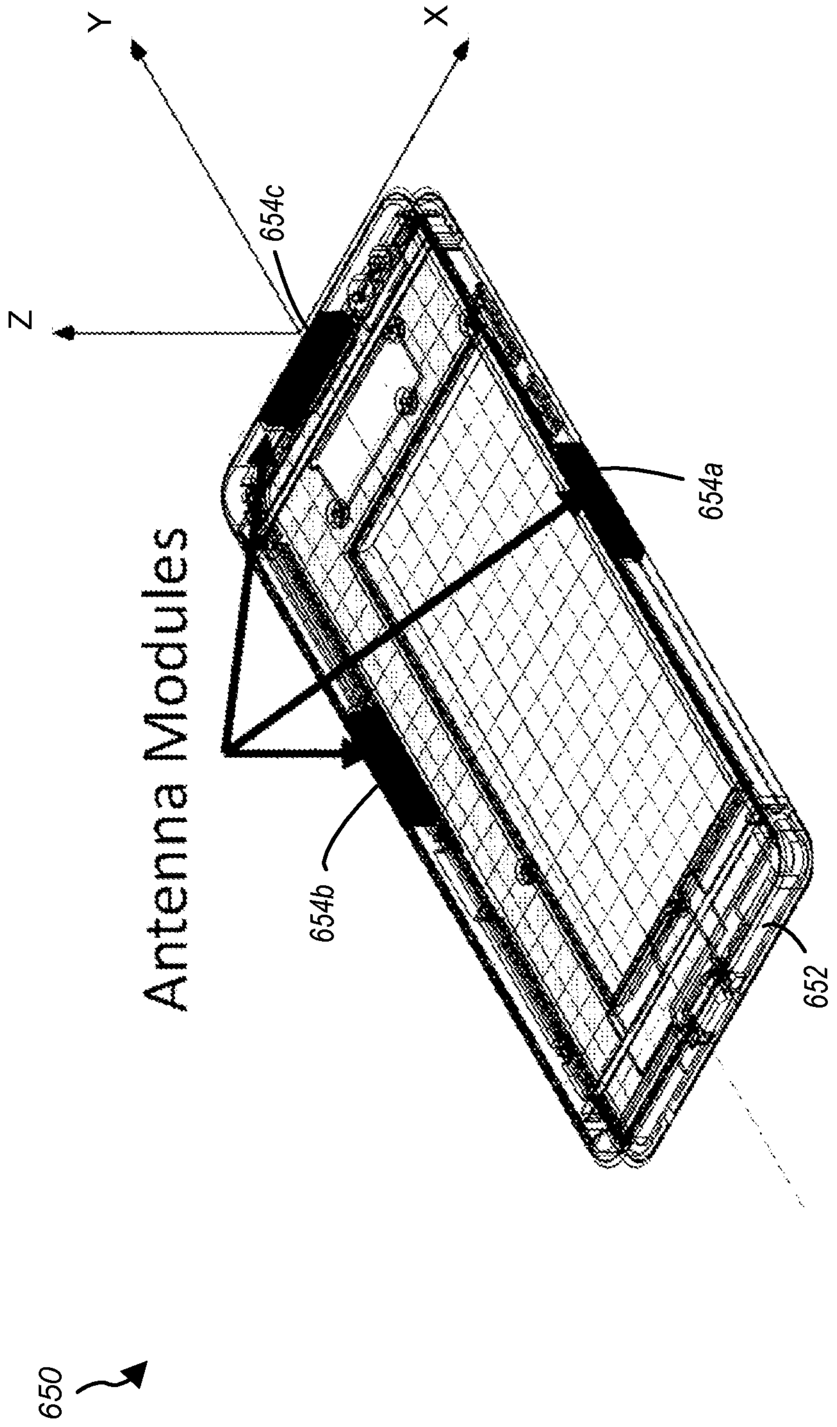
FIG. 6B shows a perspective view of multiple antenna modules in a wireless device.

Referring to FIG. 6B, a perspective-view of multiple antenna modules 654*a-c* in a wireless device 650 is shown. The antenna modules 654*a-c* are examples of the antenna modules 654 in FIG. 6A. The wireless device 650 includes a frame 652 configured to receive the antenna modules 654*a-c* along the edges as depicted in FIG. 6B. In general, the thickness of the edges of the wireless device 650 is being reduced in size due to market demands. For example, it is desirable for some wireless devices to have edge thicknesses that are less than 4.0 millimeters. The frame 652 may include one or more mounting assemblies configured to secure one or more antenna modules 654*a-c* along the edges to improve the coverage area of the wireless device 650. The multiple antenna modules 654*a-c* enable 3D operation, such as depicted in FIG. 3. The locations of the antenna modules 654*a-c* are examples, as different wireless devices may have other edge features/controls such as volume, on/off, scroll wheels, etc. which may impact the antenna configuration. In some examples, an antenna array which is not packaged into a module may be included instead of any of the antenna modules 654. In such examples, each antenna array may be coupled to a respective or common RFIC disposed on a main board of the wireless device 650.

Embodiment patch antennas and patch antenna arrays can be incorporated into the devices described hereinabove, such as into the wireless device 110 in FIG. 1, onto or into the substrate 220 in FIG. 2, in place of the patch antenna 410 in FIG. 4, In place of the patch antenna array 524 and or corresponding passive patches 526 in FIG. 5, into the antenna module 654 (or as a standalone antenna array) in FIG. 6A, and into the antenna modules 654*a-c* (or as one or more standalone antenna arrays) in FIG. 6B.

Figure 7B:
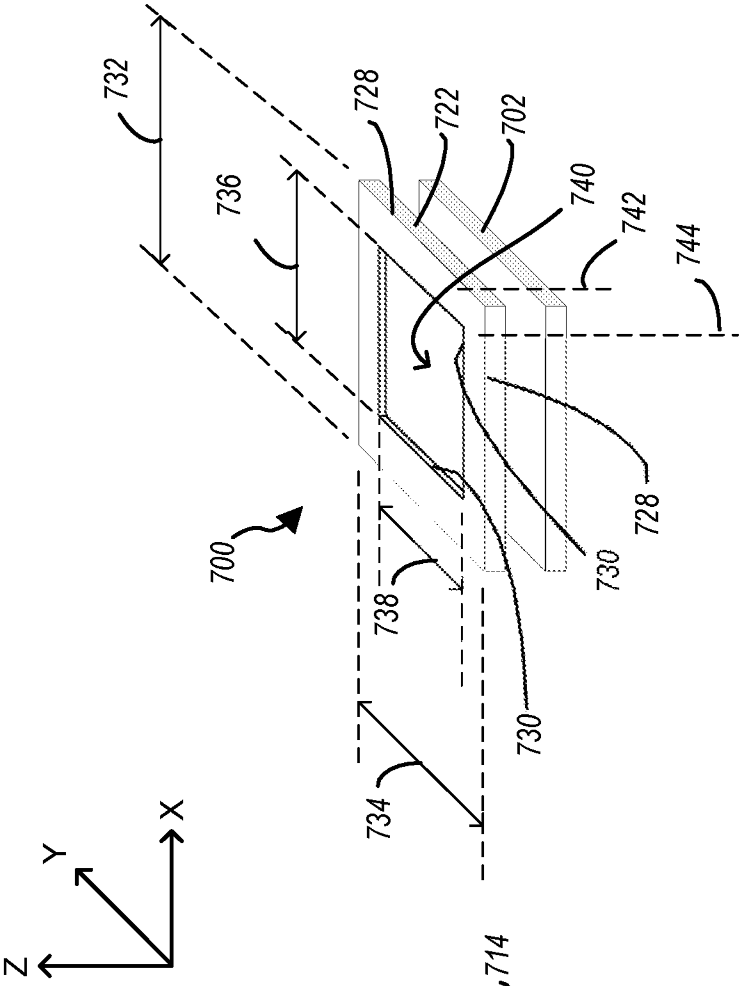
FIG. 7B is a perspective-view illustration of an embodiment patch antenna.
Figure 7A:
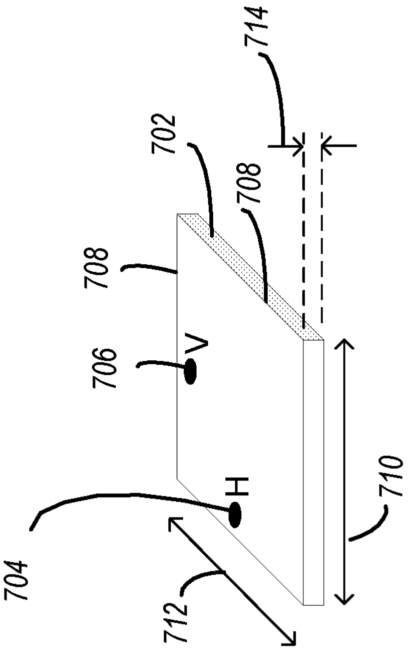
FIG. 7A is a perspective-view illustration of an active element, in the form of a rectangular patch, that may be used as part of an embodiment patch antenna illustrated in FIG. 7B.

FIG. 7A is a perspective-view diagram illustrating details of an active element 702 that can be used as part of an embodiment patch antenna. The active element 702 is also referred to herein as a "metallic patch," "patch antenna," "rectangular patch," and the like. The active element 702 can form part of embodiment patch antennas, including in use as low-band patch antennas in a dual-band array, that can provide benefits described hereinabove and also hereinafter. The mutually orthogonal X, Y, and Z axes are oriented similarly, with respect to patch antennas and arrays, for FIGS. 7A-7F and FIG. 8.

Generally, the active element 702 includes a rectangular metallic patch having an outer edge 708 that is perfectly or substantially rectangular, a length 710 in the X direction shown, a width 712 in the Y direction that is shown, and a thickness (height) 714 in the Z axis direction that is shown. In the particular embodiment of FIG. 7A, the length 710 and width 712 are equal, such that the active element 702 is square, and the outer edge 708 is an outer square edge (including the portions pointed out in the drawing) that defines four equilateral sides of the square patch. In some embodiments, each of the four equilateral sides of the square patch can have both the length 710 and width 712 about 1.65 mm to be directed to the 28 GHz band. "About," as used herein, indicates the tolerance on these example length and width measurements as described hereinabove.

In embodiments implemented in interleaved patch antenna arrays, differently sized patch antennas are directed to the higher-frequency and lower-frequency bands (higher and lower with respect to each other). For this reason, each given patch antenna in an array can preferably be configured to provide one particular frequency band, and it can be preferable for the active element 702 to be square, such that the resonant frequency of the active element is the same in both orientations, as understood by those of skill in the art. Nonetheless, in other embodiments, the active element 702 can generally be rectangular, such that the length 710 and width 712 of the active element 702 are different.

Still referring to FIG. 7A, exemplary feed points 704 (horizontal polarization feed point H) and 706 (vertical polarization feed point V) are shown. The first (H) feed point 704 is disposed along one side of the rectangular outer edge 708, approximately halfway along the width 712 dimension. The second (V) feed point 706 is disposed approximately halfway along an adjacent side of the rectangular outer edge 708, corresponding to the length 710 dimension. The distances of the feed points 704, 706 from their respective edges may vary based on impedance measurements (i.e., the locations of the feed points 704, 706 may be used for impedance matching). In a general example of a rectangular active element in which the length 710 and width 712 dimensions differ, the rectangular active element will generally produce two different frequency bands, one a relatively higher band and the other a relatively lower band. In that generalized case, the two feed points 704, 706 can be utilized to excite the lower and higher bands, respectively, or vice versa, for example, depending on the relative length and width dimensions. However, in the preferred case of a square active element, as illustrated in FIG. 7A, the patch produces one frequency band, and the respective feed points may be selectively used solely on a basis of desired polarization, for example. The same example locations of the H and V feed points are similarly illustrated in FIGS. 7E-7F and FIG. 8. In other embodiments, one or both of the feed points 704, 706 are disposed at a location other than halfway along its respective edge, on a basis of other desired polarizations or other factors, for example, and more or fewer than two feed points can be used based on design choices known to those of skill in the art in view of existing patch antennas. Feeds may be directly connected to the active element 702 at the points 704, 706 (or other points, as described above), or one or more feeds may be capacitively coupled to the active element 702.

FIG. 7B is a perspective-view illustration of an embodiment patch antenna 700 that includes both the active element 702, as shown in FIG. 7A, and a passive element 722. The patch antenna 700 can be referred to herein as a "low-band" patch antenna, in the sense that it is particularly useful when directed to a relatively lower-frequency band of a dual-band patch antenna array. Nonetheless, the patch antenna 700 can be configured for, and operated at, a wide range of frequency bands. The passive element 722 includes a metal ring and can be referred to herein as a "metal ring," "metallic ring," or simply a "ring." The passive element 722 has an outer edge 728 and an inner edge 730, with two illustrative portions thereof specifically indicated in FIG. 7B. The outer edge 728 and the inner edge 730 define and delimit the ring of the passive element 722. The passive element 722 has an outer length 732 of the outer edge 728 and an outer width 734 of the outer edge 728. In this particular embodiment, the outer length 732 and outer width 734 are the same, such that the outer edge 728 of the passive element 722 is square. Moreover in this embodiment, the outer length 732 is the same as the length 710 of the active element 702, which is below the passive element 722. Likewise, the outer width 734 of the passive element 722 is the same as the width 712 of the active element 702. Thus, the lengths and widths of the active element 702 and passive element 722 may be approximately the same. In an embodiment directed to the 28 GHz band, the outer edge 728 being square, the outer length 732 and outer width 734 preferably can both be about 1.65 mm.

Figure 8:
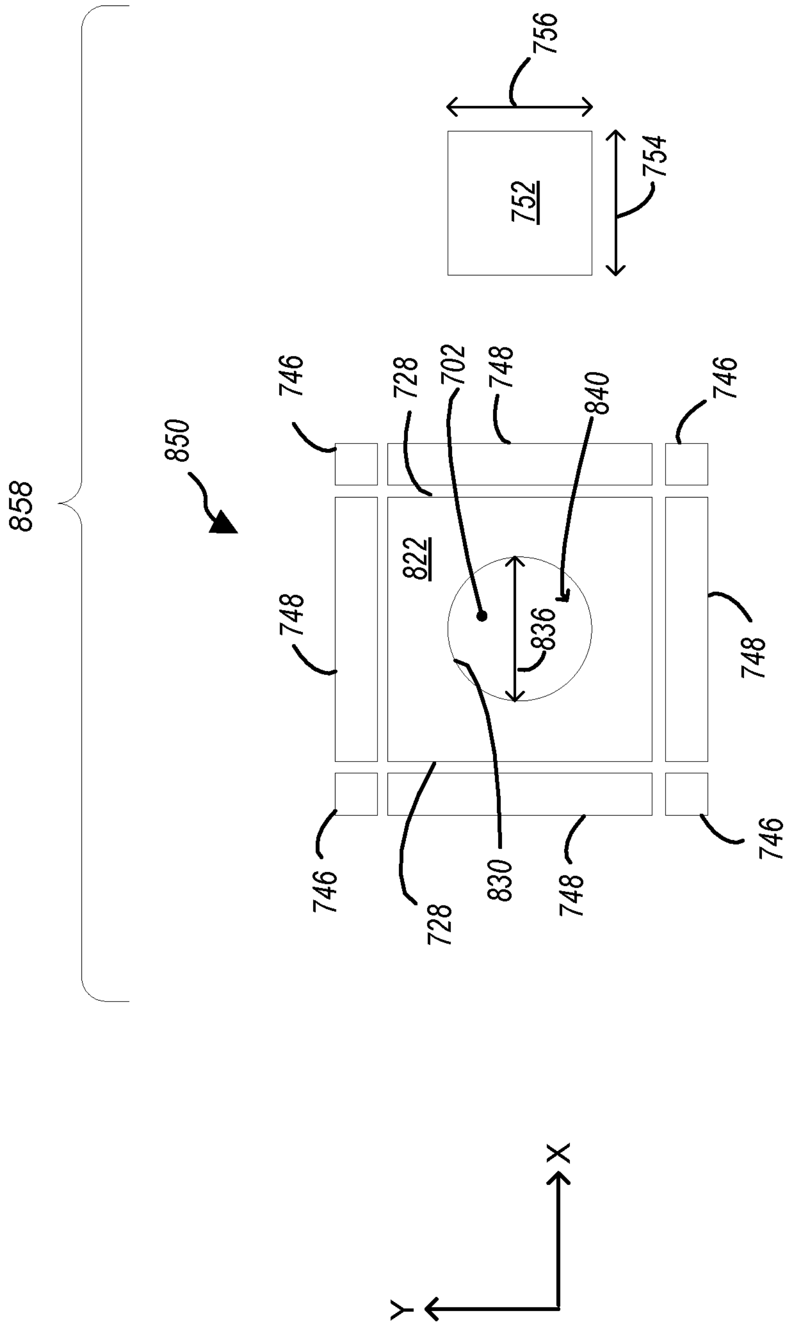
FIG. 8 is a top-view illustration of an alternative embodiment patch antenna having a passive element with a circular inner opening, together with a high-band patch antenna element.

The inner edge 730 defines an inner opening 740, which extends through the passive element 722. The metal ring of the passive element 722 encompasses the inner opening 740. The inner edge 730 and inner opening 740 of the passive element 722 in FIG. 7B are rectangular (and in this preferred embodiment, more particularly, square). However, the passive element 722, which includes a metal ring, can have inner openings of other shapes, including a circular inner opening, as illustrated in FIG. 8. In yet other embodiments, the outer edge, inner edge, and inner opening may form other shapes such as ellipses, ovals, and other polygons. Given that both the outer edge 728 and the inner edge 730 are squares that are centered with respect to each other, the passive element 722 has multiple axes of symmetry. Two example axes of symmetry are in the plane defined by the outer edge 728 and inner edge 730 of the passive element 722; parallel to adjacent sides of the outer edge 728 and the inner edge 730, respectively; and pass through a center of the inner opening 740. Other example axes of symmetry may be defined between corners of the outer edge 728 or the inner edge 730. Other embodiments may have zero, one, two, or more than two axes of symmetry.

Figure 7D:
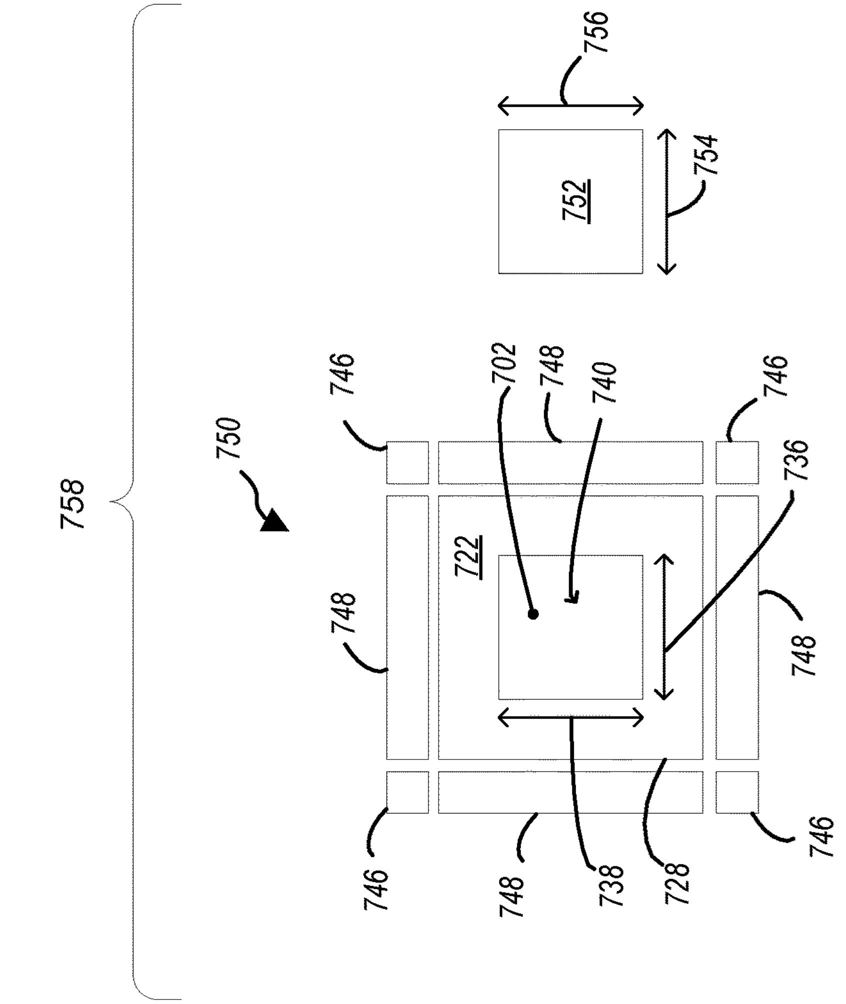
FIG. 7D is a top-view illustration of an embodiment patch antenna employed for low-band performance, and a high-band patch antenna, situated adjacently to form a dual-band patch antenna.
Figure 7C:
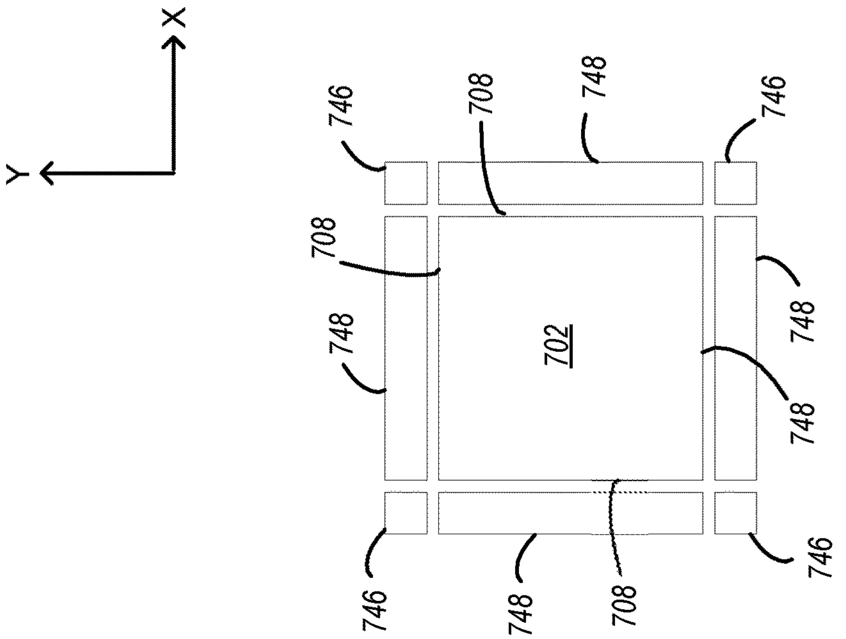
FIG. 7C is a top-view illustration of the active element shown in FIG. 7A, together with a plurality of peripheral, passive, metallic elements disposed around on the outer edge of the active element.

Dimensions of the inner edge 730, being rectangular (and particularly square in this case) include an inner length 736 and an inner width 738. These inner dimensions preferably may be close to dimensions of an adjacent high-band patch element in dual-band patch antenna, further described hereinafter in connection with FIG. 7C and FIG. 8. In some embodiments, the inner edge 730 has the inner length 736 and the inner width 738 both being approximately 1.0 mm. In the patch antenna 700, which can function in a relatively lower-frequency band as a "low-band" patch antenna, each side of the inner edge 730, which is square in this embodiment, has the inner length 736 and the inner width 738 both about 1.0 mm. Size of the inner opening 740, defined by the inner length 736 and the inner width 738, may affect the center of the frequency band. A compensation may be made for this effect by providing a plurality of passive, parasitic patch elements disposed around the active element 702, as illustrated in FIG. 7C. Alternatively, a compensation in frequency of the band can be provided by adjusting the size of the active element 702, (via the length 710 and width 712 dimensions), and corresponding outer length 732 and outer width 734 dimensions of the passive element 722.

A layer of dielectric material (not shown in FIG. 7B, but illustrated further in FIG. 7E and FIG. 7F) may be disposed between the active element 702 and the passive element 722. A dielectric constant $D_k$ of the dielectric material may be in a range of about 5.0 to 9.8. In particular embodiments, the dielectric constant $D_k$ of the dielectric material may be in a range of about 4.4 to about 6.4, in a range of about 9.0 to about 9.8, or in a range of about 5.0 to about 9.8. More particular values of about 5.4 and about 9.4 have been demonstrated to be favorable for certain embodiments. More generally, $D_k$ can be in a range about 3.0 to about 12 in various embodiments, and dimensions may be adjusted accordingly.

The passive element 722 is disposed above the active element 702. Consistent with the usage of this term herein, the active element 702 and passive element 722 are substantially parallel to each other, with planes formed by the active element 702 and passive element 722 being substantially parallel to the XY plane shown and thus being substantially parallel to each other. The active element 702 and passive element 722 are displaced from each other in the Z direction, perpendicular to the XY plane. The active element 702 and passive element 722 have complete alignment, providing complete overlap, as viewed in the Z direction shown. This complete alignment is illustrated in FIG. 7B by a perfect lateral alignment 742 in the X direction, denoted by a dashed line, and a perfect lateral alignment 744 in the Y direction, denoted by a dashed line. In the illustration shown, both alignments are perfect. Nonetheless, in various embodiments, this alignment is about or approximately perfect, providing nearly complete overlap of the active element **70*s* and passive element 722. In other embodiments, the outer edges 708 of the active element 702 are not aligned with the outer edges 728 of the passive element 722, such that the active element 70*s* and passive element 722 overlap only partially when viewed in the Z direction. For example, the active element 702 may be larger than the passive element 722. In such examples, a projection of the active element 702 in the Z direction may fully enclose the passive element 722. In other examples, outside dimensions of the passive element 722 are larger than outside dimensions of the active element 702. In still other examples, outside dimensions of the passive element 722 and the active element 702** are the same, but there is lateral offset between them in the X direction, the Y direction, or both.

FIG. 7C is a top-view illustration of the active element 702 of FIG. 7A surrounded by a plurality of peripheral, passive, metallic elements disposed around the outer rectangular edge 708 of the active element 702. In particular, in this embodiment, the plurality of peripheral, passive, metallic elements includes corner elements 746 (e.g., having a square shape) situated at corners of the active element 702, together with side elements 748 (e.g., having an elongated or rectangular shape) situated at sides of the active element 702. The plurality of peripheral, passive, metallic elements are electrically isolated from the rectangular patch 702 and from each other. The plurality of peripheral, passive, metallic elements in various embodiments may include a total of 8 elements, as illustrated in FIG. 7C, with the corner elements 746 situated symmetrically at corners of the active element 702, and with the side elements 748 situated adjacent and parallel to sides of the active element 702 around the outer rectangular edge 708 thereof. Alternatively, the plurality of peripheral, passive, metallic elements can include a total of four passive elements, or another number of passive elements, provided that the passive elements are situated symmetrically (e.g., reflectionally symmetric or rotationally symmetric) around the active element 702, or there may be a single peripheral, passive, metallic element shaped as a ring surrounding the active element 702. The plurality of peripheral, passive, metallic elements has a tendency to increase bandwidth of the active element 702 and to shift the center of the frequency band down. This can be used to compensate for a tendency of the passive element 722, illustrated in FIG. 7B, to shift up the resonant frequency band of the active element 702. (The passive element 722 and the plurality of peripheral, passive, metallic elements shown in FIG. 7D are illustrated in combination in the embodiment of FIG. 7D.) Accordingly, these effects can cancel each other, such that the overall center frequency range of the patch antenna, illustrated in FIG. 7D, may remain unchanged. The corner elements 746 and the side elements 748 are coupled with each other electromagnetically and do not have a physical, electrical connection.

FIG. 7D is a top-view diagram of an embodiment dual-band patch antenna 758, which may be considered a dual-band patch antenna of an embodiment dual-band patch antenna array. The dual-band patch antenna 758 includes an embodiment low-band patch antenna 750, directed to a relatively lower-frequency band, and a high-band patch antenna 752, directed to a relatively higher-frequency band. The low-band patch antenna 750 includes the active elements 702, the plurality of peripheral, passive, metallic elements including the corner elements 746 and the side elements 748 illustrated in FIG. 7C and the passive element 722 that forms a metal ring, illustrated in FIG. 7B. Given that the passive element 722 is disposed above the active element 702, a portion of the active element 702 is visible through the inner opening 740, as indicated by a dot at the end of the active element 702 leader line.

An arrangement such as that shown in FIG. 7D has particular advantages in dual-band performance. The low-band patch antenna 750 may be optimized for low-band performance, such as gain over the 28 GHz band noted above, while the high-band patch antenna 752 may be optimized separately for gain in the 39 GHz band, as noted above. In other words, the low-band patch antenna 750, when electrically driven, may radiate in the 28 GHz band, specifically with a peak gain in a range of 24.25-29.5 GHZ. Correspondingly, the high-band patch antenna 752 may be separately optimized for gain that is centered in a high band, for example the 39 GHz band, centered in the range of 37-43.5 GHZ. The passive element 722 may have the inner opening 740, with the inner length 736 and the inner width 738, sized similarly to a length 754 and a width 756, respectively, of the high-band patch antenna 752. Accordingly, the inner edge 730, which is illustrated in FIG. 7B, defining the inner opening 740, is sized to suppress production of radiation, by the low-band patch antenna 750, at a second harmonic of the low frequency band. Such sizing can substantially prevent or reduce coupling and interference between the elements, such as via high-band radiation from the high-band patch antenna 752 exciting a second harmonic frequency band of the low-band patch antenna 750. This excitation may otherwise occur much more substantially without the passive element 722. Arrangement of the low-band patch antenna 750 and high-band patch antenna 752 as part of a full, dual-band patch antenna array is illustrated in FIG. 7E and FIG. 7F.

Figure 7E:
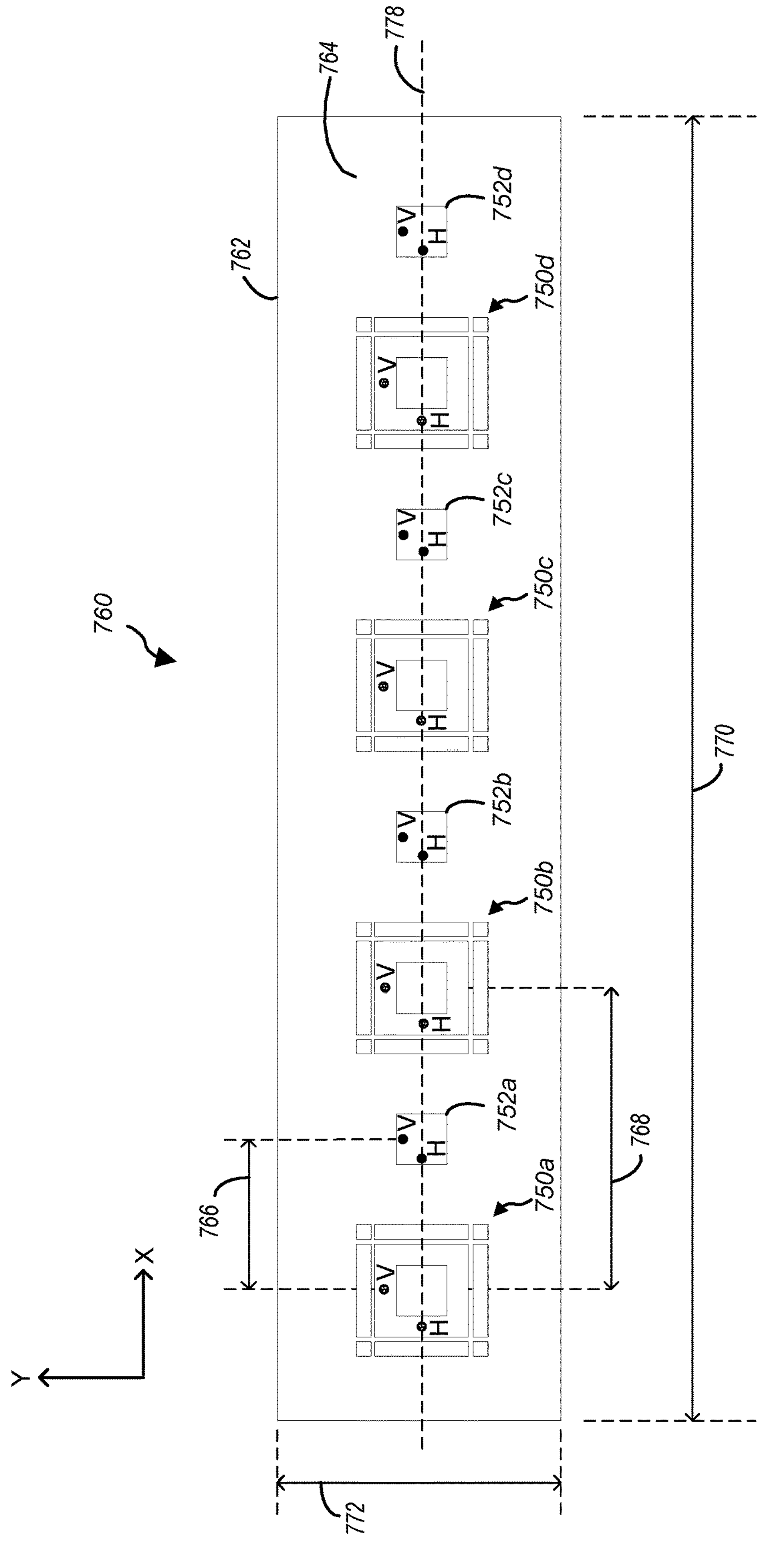
FIG. 7E is a top-view illustration of an embodiment patch antenna array utilizing dual-band patch antenna elements as illustrated in FIG. 7D.
Figure 7F:
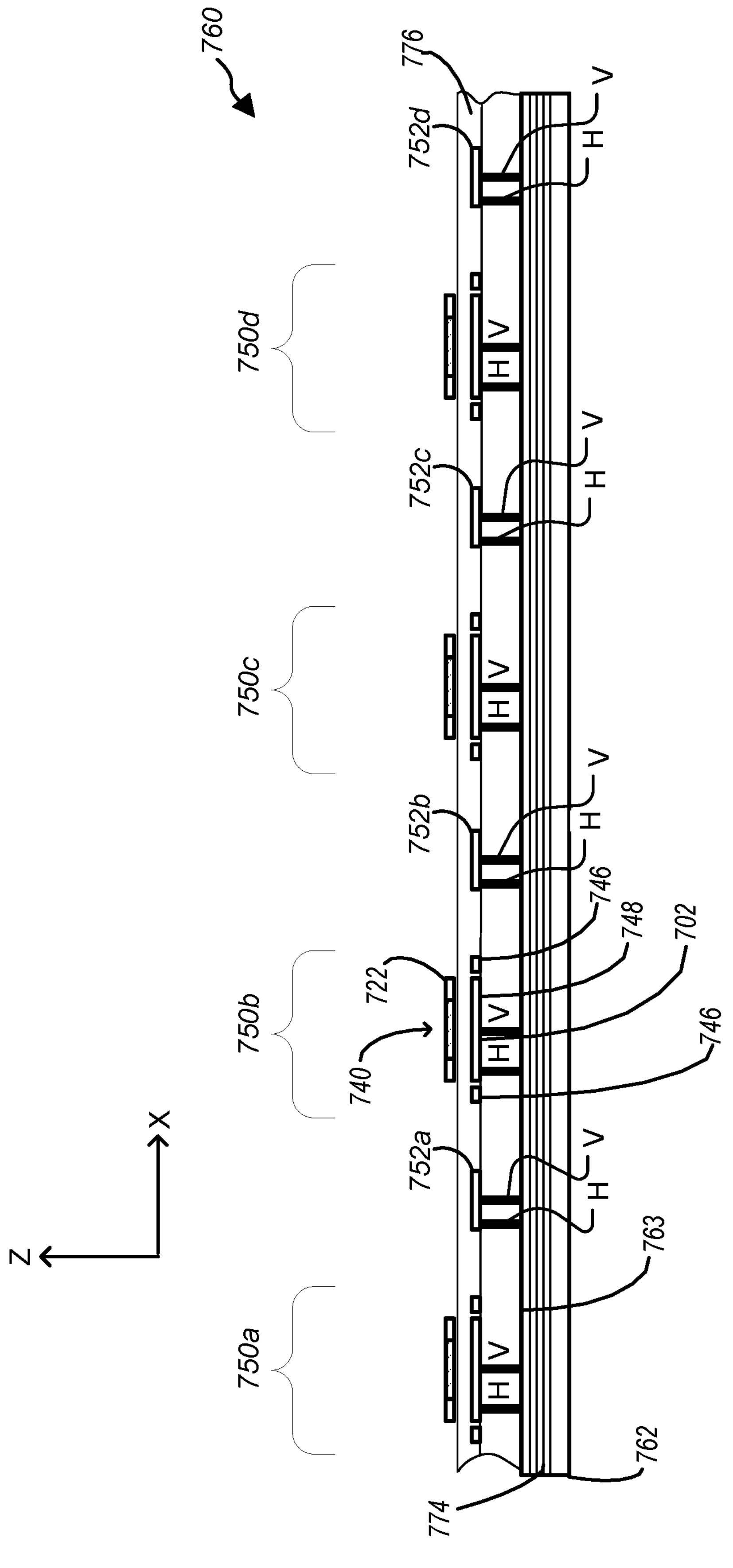
FIG. 7F is a side-view illustration of an embodiment patch antenna array utilizing dual-band patch antenna elements as illustrated in FIG. 7D.

FIG. 7E is a top-view illustration of an embodiment, dual-band patch antenna array 760, which includes a plurality of high-band patch antennas 752*a-d*, consistent with the high-band patch antenna 752 in FIG. 7D. The high-band patch antennas 752*a-d* are configured to radiate, when electrically driven, at frequencies in a relatively higher frequency band, such as the 39 GHz band. The dual-band patch antenna array 760 further includes a plurality of low-band patch antennas 750*a-d*, each configured the same as the example low-band patch antenna 750 illustrated in FIG. 7D. The low-band patch antennas 750*a-d* are disposed in an interleaved arrangement with the plurality of high-band patch antennas 752*a-d*, in this case along a long axis 778 of the patch antenna array passing through the center of the antennas 750, 752. For convenience, each of the low-band patch antennas 750*a-d* may be represented as "A," and each of the high-band patch antennas 752*a-d* may be represented as "B." With these symbols, the interleaved arrangement of FIG. 7E, may be conveniently denoted by "ABABABAB." However, it should be understood that other interleaved arrangements can be provided in other embodiments, such as ABBA, BAAB, AABBAABB, BAABAAB, etc. Furthermore, other multiband embodiments have more bands than the dual bands shown in FIG. 7E. For example, in implementations having a third band represented as "C," arrays may be interleaved in arrangements denoted as ABCABC, ABBCCA, ACACABAB, etc. A center-to-center separation 766 in the X axis direction, along the long axis 778, between adjacent high-band and low-band patch antennas can be about 4.6 mm (0.43λ, where λ is the carrier wavelength 10.7 mm at a 28 GHz frequency) in some embodiments. More generally, the center-to-center separation 766 can be in a range of about 4.0 mm (0.37λ) to about 6.0 mm (0.56λ) in various embodiments. Correspondingly, an example center-to-center separation 768 in the same direction between nearest high-band or nearest low-band patch antennas to each other can be about 9.2 mm (0.86λ) in some embodiments, or, more generally, in a range of about 8.0 mm (0.75λ) to about 12.0 mm (1.1λ) in various embodiments.

Each of the low-band patch antennas 750*a-d* includes the active element 702, the passive element 722 having a ring with the outer edge 728 and the inner edge 730, with the inner edge defining the inner opening 740. These features are illustrated in one or more of FIGS. 7A-7D and are particularly pointed out in a side-view illustration of the dual-band patch antenna array 760, which is included in FIG. 7F. Each of the low-band patch antennas 750*a-d* includes the optional plurality of peripheral, passive, metallic elements including the corner elements 746 and the side elements 748, which are illustrated and marked in FIGS. 7C-7D, and which are marked by way of example in the side view in FIG. 7F. The dual-band patch antenna array 760 of high-band and low-band patch antennas is disposed on a substrate 762 (also referred to herein as a "substrate" or "dielectric substrate"), which has a substrate length 770 and a substrate width 772. The substrate width 772 dimension of the substrate 762 can advantageously be less than 3.2 mm. Further, in some embodiments, the substrate width 772 can be less than or equal to 3.0 mm.

The substrate 762 can be formed, in whole or in part, of a dielectric material 764. One or more layers of the dielectric material 764 can be disposed between the active element 702 and the passive element 722 in each of the low-band patch antennas 750*a-d*, as illustrated more particularly in FIG. 7F. A dielectric constant $D_k$ of the dielectric material can be in a range of about 5.0 to 9.8. In particular embodiments, the dielectric constant $D_k$ of the dielectric material can be in a range of about 4.4 to about 6.4, in a range of about 9.0 to about 9.8, or in a range of about 5.0 to about 9.8. More particular values of about 5.4 and about 9.4 have been demonstrated to be favorable for certain embodiments. More generally, $D_k$ can be in a range about 3.0 to about 12 in various embodiments, and dimensions may be adjusted accordingly.

Exemplary feed points for horizontal (H) and vertical (V) polarizations are also shown in FIG. 7E, as described further in connection with FIG. 7A. However, in FIG. 7E, the H and V feed points are shown in pattern fill for the low-band patch antennas 750*a-d*, denoting that they are not visible in the top-view illustration since they are obscured by the passive element 722 of each low-band patch antenna 750*a-d*. As described above, embodiments are compatible with various polarization configurations and other properties that can be provided by implementing the feed points at different locations on the patch, as understood by those of skill in the art. For example, the polarization types H and V illustrated in FIG. 7E may be replaced with slant polarizations in the low-band patch antennas 750*a-d*, the high-band patch antennas 752*a-d*, or both, such as via different placements of the feed points. Further, the polarizations may be different for different patch antennas of the low-band patch antennas 750*a-d*, the high-band patch antennas 752*a-d*, or both. The feed points are all illustrated in FIG. 7E as being in the same relative places on each patch antenna. However, in other embodiments, the feed points are at different relative places. For example, feed points for the low-band patch antennas 750*a-d*, the high-band patch antennas 752*a-d*, or both may be different. Further, the feed points may vary in placement within a band (e.g., rotate in relative placement or be mirrored in relative placement). For example, an H feed point may be on the left side in half of the patch antennas and on the right side in the other half of the patch antennas for the same band. As with the feed points for the low-band patch antennas, the high-band feeds can be directly connected or capacitively coupled.

Patch shapes and patch array configurations may also be different from those illustrated in FIG. 7E in various ways. For example, the high-band patches may be of another shape, such as a clover shape. Further, various antennas (e.g., one or more of the high-band patch antennas) in an array may be dipoles instead of patches. More or fewer antennas of each type, including a different number of high-band antennas than low-band antennas, may be provided in other embodiments.

In some embodiments, such as where the inner edge defining the inner opening of the metal ring of each of the low-band patch antennas is a square edge, a length of each square edge is larger than a length of active elements of each of the plurality of high-band patch antennas.

FIG. 7F is a side-view illustration of the embodiment, dual-band patch antenna array 760 of FIG. 7E, showing the same and additional features of the dual-band patch antenna array 760 in the alternative view. As also illustrated in FIG. 7E, the low-band patch antennas 750*a-d* and the high-band patch antennas 752*a-d* are situated on the substrate 762, interleaved in a 1×8 example array. Each of the low-band patch antennas 750*a-d* includes the same components as the low-band patch antenna 750 illustrated in FIG. 7D. Certain particular components of the low-band patch antennas 750*a-d* are labeled for the example antenna 750*b* for additional clarity and comparison with the top-view illustrations provided in FIG. 7D and FIG. 7E. In the side view of FIG. 7F, the inner opening 740 is shown with diagonal hash marks, in this case indicating that the inner opening 740 is actually obscured from the side view by the passive element 722.

The substrate 762 may be operably coupled to, or integrated with, the example MMW module PCB 520 of FIG. 5. Example vias labeled 'H' and 'V' provide signals to the active elements at the feed points H and V shown in FIGS. 7A and 7E. In an example, the substrate 762 is a planar substrate with a top surface and a bottom surface, and one or more signal lines 774 are disposed between the top surface and the bottom surface of the substrate 762. The substrate 762 may include a conductive cladding 763 (e.g., Cu, Ag) configured as a ground plane. The substrate may comprise a printed circuit board, and the signal lines 774 may be microstrip lines configured to transfer electrical signals to and from vias and feed points of the low-band patch antennas 750*a-d* and of the high-band patch antennas 752*a-d*. For example, the signal lines 774 may be configured to couple the patch vias operably with the RFIC 516 illustrated in FIG. 5. In an example manufacturing process, the dual-band patch antenna array 760, which is interleaved, may be constructed by forming successive dielectric layers 776 on the substrate 762, and one of the successive dielectric layers 776 may be disposed between the active element 702 and passive element 722 of each low-band antenna. In an example, the successive dielectric layers 776 may be a printed circuit board material (e.g., prepreg) with a dielectric constant $D_k$ in the range of about 4.4 to about 6.4, in a range of about 5.0 to about 9.8, or in a range of about 9.0 to about 9.8. In some particular examples, $D_k$ values of about 5.4 or about 9.4 have been favorably used. More broadly, the $D_k$ can be in a range of about 3.0 to about 12, and dimensions may be adjusted accordingly. In other examples, one or more of the low-band patch antennas 750*a-d* and the high-band patch antennas 752*a-d* are manufactured separately from the substrate 762 (e.g., the successive dielectric layers 776 may be separate from the portion of the substrate in which the signal lines 774 are implemented and/or unique to one or more of the low-band patch antennas 750*a-d* and one or more of the high-band patch antennas 752*a-d*).

As exemplified in FIG. 7F, the outer edges of the active element 702 of each antenna may be aligned perfectly with the outer edges of the passive element 722 of the antenna, viewed from the Z direction perpendicular to the planes of the active element 702 and passive element 722. In this case, a complete overlap is provided between the active element 702 and the passive element 722. In other embodiments, the outer edges of these elements are not aligned, and lateral overlap between the active element 702 and the passive element 722 in a plane of either one, viewed from the Z direction, is only partial. The peripheral elements 746, 748 are illustrated as being disposed in a same layer as the active element 702. In other embodiments, the peripheral elements 746, 748 are disposed in a different layer than the active element 702, for example in a layer between the active element 702 and the passive element 722. In some embodiments, the peripheral elements 746, 748 are omitted. In some such embodiments, an edge of the active element 702 may have a length equal to a length between outer edges of the peripheral elements 746 in the illustrated configuration, or a size between such length and the illustrated length of the edge of the active element 702.

In some embodiments, a passive element may be disposed above one or more of the high-band patch antennas 752. For example, such passive element may be disposed in a same layer as the passive elements 722. The passive element(s) above the high-band patch antenna(s) 752 may be approximately a same size and shape as a corresponding high-band patch antennas 752, or may be somewhat larger or smaller.

FIGS. 7E-7F, like the other drawings, are not necessarily to scale, emphasis instead being placed upon illustrating embodiments and general arrangements.

While the dual-band patch antenna array 760 in FIGS. 7E-7F depicts a 1×8 array of interleaved patch antennas, other array dimensions such as 1×2, 1×4, 1×6, 1×10, etc. may be used. In an example, wider arrays of interleaved patches such as 2×2, 2×4, 2×6, 2×8, 4×4, 4×6, 4×8, 6×6, 6×8, 8×8, etc. may be used. In such embodiments, each row may include patch antennas having interleaved, low-band patch antennas such as the low-band patch antennas 750*a-d*, and high-band patch antennas such as the high-band patch antennas 752*a-d*. Each column may also be formed of patch antennas having interleaved low-band and high-band configurations. The dual-band patch antenna array 760 may be integrated in the MMW module PCB 520 of FIG. 5 or disposed on one or more antenna carriers and operably coupled to the RFIC 516 of FIG. 5 via one or more connector cables or coupling mechanisms. Various three-dimensional (3-D) solutions may also be realized such that multiple dual-band patch antenna arrays 760 may be disposed on two or more sides of a mobile device, which may correspond with the patch antenna arrays 330, 340 in FIG. 3. More than one antenna carrier assembly (i.e., multiple parts) may be used to support the dual-band patch antenna array 760. In an example, a device cover may be used as the antenna carrier. Other structures may also be used to secure radiator arrays on one or more geometric planes.

FIG. 8 is a top-view illustration of an embodiment, alternative dual-band patch antenna 858 and corresponding low-band patch antenna 850, which are one alternative to the dual-band patch antenna 758 and the corresponding low-band patch antenna 750 of FIG. 7D. The low-band patch antenna 850 includes a passive element 822 forming a metal ring. The passive element 822 differs from the passive element 722 of the low-band patch antenna 750, in that the passive element 822 has a circular inner edge 830 defining a circular opening 840. A portion of the active element 702 is still visible through the circular opening 840, as indicated. The circular inner edge 830 and circular opening 840 have a diameter 836. The diameter 836 may be approximately the same as the length 754 and width 756 of the high-band patch antenna 752, which also forms part of the alternative dual-band patch antenna 858. Accordingly, in some embodiments, if the length and width of the high-band patch antenna 752 are about 1.0 mm, then the circular inner edge 830 of the passive element 822 should also have a diameter of about 1.0 mm.

Given the approximate matching of the diameter 836 to the length 754 and width 756, a benefit similar to that provided by the passive element 722 of FIG. 7D can be obtained, namely suppression of a second harmonic response of the low-band patch antenna 850 to high-band radiation from the high-band patch antenna 752. Otherwise, absent a passive element such as the passive element 822, the second harmonic response of the low-band patch antenna 850 could substantially interfere with gain and scanning performance of the high-band patch antenna 752. In other embodiments, the diameter 836 of the circular edge 830 is larger than the length 754 and width 756 of the high-band patch antenna 752, and each pair of high- and low-band patch antennas in an embodiment array can be similarly dimensioned.

Although the passive element 822 of the low-band patch antenna 850 maintains the square outer edge 728 of passive element 722 in the low-band patch antenna 750, in other embodiments the outer edge of the passive element 822 is circular. In the case of a circular outer edge of a passive element, an example diameter of the outer circular edge can be approximately 1.65 mm to match example length and width dimensions of the active element 702 disposed under the passive element 822. In this case, the outer circular edge of the passive element can be aligned with the outer edge of the rectangular (square) patch by means of geometric centers of the active and passive elements being aligned in planes parallel to the x-y plane, a line between the two geometric centers being parallel to the z-axis. Viewed alternatively, alignment can be optimized by lateral extremes of the outer circular edge (not shown) being aligned with the outer edge of the active element 702 at four different sides of the active element 702. In this embodiment, perfect alignment still provides only a partial lateral overlap of the passive element 722 with the active element 702 due to the difference in shapes.

Figure 9:
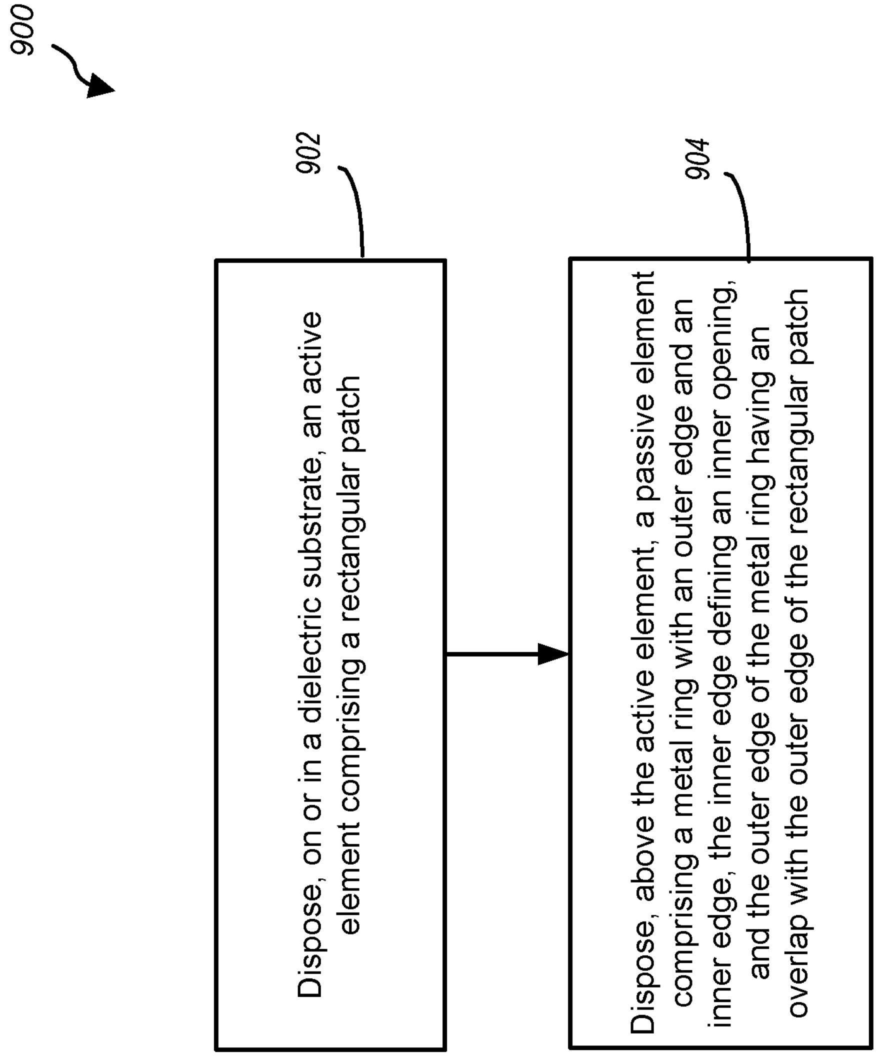
FIG. 9 is a flow diagram illustrating an example procedure for constructing an embodiment patch antenna.

FIG. 9 is a flow diagram illustrating an example procedure 900 for manufacturing an embodiment patch antenna, such as the patch antenna 700, the low-band patch antenna 750, and the low-band patch antenna 850 of FIGS. 7B, 7D, and 8, respectively. At stage 902, an active element comprising a rectangular patch is disposed on or in a dielectric substrate. For example, the active element can be the active element 702 illustrated in FIGS. 7A-7F and FIG. 8. The dielectric substrate can be the dielectric substrate 762 illustrated in FIG. 7E and FIG. 8; can include the substrate 762 or successive dielectric layers 776 illustrated in FIG. 7F; and can be of the dielectric material 764 illustrated in FIG. 7E, for example. At stage 904, a passive element comprising a metal ring with an outer edge and an inner edge is disposed above the active element, with the inner edge defining an inner opening, and with the outer edge of the metal ring having an overlap with the outer edge of the rectangular patch. The passive element can be the passive element 722 of FIGS. 7B and 7D or the passive element 822 of FIG. 8, for example. The overlap can be provided by the degree of lateral alignment 742 in the X direction and the degree of lateral alignment 744 in the Y direction, both illustrated in FIG. 7B, or by the alignment illustrated and described in connection with FIG. 8, for example. Alternatively, the overlap can be a lesser degree of lateral overlap.

The procedure 900 is an example and not limiting. The procedure 900 can be altered, for example, by having stages added, removed, rearranged, combined, performed concurrently, and/or having single stages split into multiple stages. For example, the procedure 900 can be modified to include implementation of any of the optional features noted in the summary, including for manufacturing an embodiment interleaved patch antenna array.

Implementation Examples

Implementation examples are provided in the following numbered clauses.

Clause 1. A patch antenna array, comprising:

- a plurality of high-band patch antennas configured to radiate, when electrically driven, at frequencies in a relatively higher frequency band; and a plurality of low-band patch antennas configured to radiate, when electrically driven, at frequencies in a relatively lower frequency band, the plurality of low-band patch antennas disposed in an interleaved arrangement with the plurality of high-band patch antennas;

wherein each patch antenna of the plurality of low-band patch antennas includes:

an active element; and a passive element comprising a metal ring with an outer edge and an inner edge, the inner edge defining an inner opening.

Clause 2. The patch antenna array of clause 1, wherein, in each patch antenna of the plurality of low-band patch antennas, the passive element is disposed above the active element, and wherein the outer edge of the metal ring has an overlap with an outer edge of the active element.

Clause 3. The patch antenna array of clause 1, further including a substrate on which the pluralities of high-band and low-band patch antennas are disposed, wherein adjacent high-band and low-band antennas of the patch antenna array are situated along a long axis of the patch antenna array.

Clause 4. The patch antenna array of clause 3, wherein adjacent high-band and low-band antennas of the patch antenna array are situated along the long axis with center-to-center separation in a range of about 4.0 mm to about 6.0 mm.

Clause 5. The patch antenna array of clause 1, further comprising a plurality of peripheral, passive, metallic elements disposed around an outer edge of the active element, wherein the plurality of peripheral, passive, metallic elements are electrically isolated from the active element and from each other.

Clause 6. The patch antenna array of clause 5, wherein the plurality of peripheral, passive, metallic elements includes four or eight peripheral, passive, metallic elements.

Clause 7. The patch antenna array of clause 1, wherein the inner edge defining the inner opening of the metal ring of each of the low-band patch antennas is sized to suppress radiation, of the respective low-band patch antenna, at the relatively higher frequency band.

Clause 8. The patch antenna array of clause 1, wherein the inner edge defining the inner opening of the metal ring of each of the low-band patch antennas is a square edge, and wherein a length of each square edge is approximately matched to a size of active elements of each of the plurality of high-band patch antennas.

Clause 9. The patch antenna array of clause 1, wherein the inner edge defining the inner opening of the metal ring of each of the low-band patch antennas is a square edge, and wherein a length of each square edge is larger than a length of active elements of each of the plurality of high-band patch antennas.

Clause 10. The patch antenna array of clause 1, wherein the inner edge defining the inner opening of the metal ring of each of the low-band patch antennas is a circular edge, and wherein a diameter of the circular edge is approximately matched to a length of active elements of each of the plurality of high-band patch antennas.

Clause 11. The patch antenna array of clause 1, wherein the inner edge defining the inner opening of the metal ring of each of the low-band patch antennas is a circular edge, and wherein a diameter of the circular edge is larger than a length of active elements of each of the plurality of high-band patch antennas.

Clause 12. The patch antenna array of clause 1, wherein the outer edge of the metal ring and an outer edge of the active element of each of the plurality of low-band patch antennas is in perfect lateral alignment.

Clause 13. The patch antenna array of clause 1, wherein the plurality of high-band patch antennas, the plurality of low-band patch antennas, or both are further configured to radiate with dual polarizations.

Clause 14. The patch antenna array of clause 1, wherein the active element of each low-band patch antenna of the plurality of low-band patch antennas is a rectangular patch.

Clause 15. The patch antenna array of clause 14, wherein each rectangular patch is square patch, the outer edge of the square patch defining four equilateral sides of the square patch.

Clause 16. The patch antenna array of clause 15, wherein each of the four equilateral sides of the square patch has a length of about 1.65 mm.

Clause 17. The patch antenna array of clause 1, wherein the inner edge of the metal ring of each passive element is an inner square edge.

Clause 18. The patch antenna array of clause 17, wherein each side of the inner square edge of each passive element has a length of about 1.0 mm.

Clause 19. The patch antenna array of clause 1, wherein each outer edge is a circular outer edge.

Clause 20. The patch antenna array of clause 19, wherein each circular outer edge has a diameter of approximately 1.65 mm.

Clause 21. The patch antenna array of clause 1, wherein the inner edge of each metal ring is a circular inner edge.

Clause 22. The patch antenna of clause 1, wherein each circular inner edge has a diameter of about 1.0 mm.

Clause 23. The patch antenna array of clause 1, wherein a layer of dielectric material is disposed between the active element and the passive element of each patch antenna of the plurality of low-band patch antennas, and wherein a dielectric constant $D_k$ of the layer of dielectric material is in a range of about 5.0 to 9.8.

Clause 24. The patch antenna array of clause 23, wherein the dielectric constant $D_k$ of the layer of dielectric material is in a range of about 9.0 to 9.8.

Clause 25. The patch antenna array of clause 1, wherein the active element and the passive element of each patch antenna of the plurality of low-band patch antennas are arranged to enable the patch antenna, when electrically driven, to radiate in a band having a peak gain in a range of 24.25-29.5 GHz.

Clause 26. The patch antenna array of clause 1, wherein the pluralities of high-band and low-band patch antennas are disposed on a substrate having a width less than 3.2 mm.

Clause 27. The patch antenna array of clause 26, wherein the width is less than or equal to 3.0 mm.

Clause 28. A patch antenna, comprising:

an active element comprising a rectangular patch including an outer edge; and a passive element comprising a metal ring with an outer edge and an inner edge, the inner edge defining an inner opening, wherein the passive element is disposed above the active element, and wherein the outer edge of the metal ring has an overlap with an outer edge of the rectangular patch.

Clause 29. The patch antenna of clause 28, wherein the rectangular patch is square patch, the outer edge of the square patch defining four equilateral sides of the square patch.

Clause 30. The patch antenna of clause 29, wherein each of the four equilateral sides of the square patch has a length of about 1.65 mm.

Clause 31. The patch antenna of clause 28, wherein the outer edge of the metal ring is an outer square edge.

Clause 32. The patch antenna of clause 31, wherein each side of the outer square edge has a length of about 1.65 mm.

Clause 33. The patch antenna of clause 28, wherein the inner edge of the metal ring is an inner square edge.

Clause 34. The patch antenna of clause 33, wherein each side of the inner square edge has a length of about 1.0 mm.

Clause 35. The patch antenna of clause 28, wherein the outer edge of the metal ring is a circular outer edge.

Clause 36. The patch antenna of clause 35, wherein the circular outer edge has a diameter of approximately 1.65 mm.

Clause 37. The patch antenna of clause 28, wherein the inner edge of the metal ring is a circular inner edge.

Clause 38. The patch antenna of clause 37, wherein the circular inner edge has a diameter of about 1.0 mm.

Clause 39. The patch antenna of clause 28, further comprising a plurality of peripheral, passive, metallic elements disposed around the outer edge of the rectangular patch, wherein the plurality of peripheral, passive, metallic elements are electrically isolated from the rectangular patch and from each other.

Clause 40. The patch antenna of clause 39, wherein the plurality of peripheral, passive, metallic elements includes four or eight peripheral, passive, metallic elements.

Clause 41. The patch antenna of clause 28, wherein a layer of dielectric material is disposed between the active element and the passive element, and wherein a dielectric constant Dk of the layer of dielectric material is in a range of about 5.0 to 9.8.

Clause 42. The patch antenna of clause 41, wherein the dielectric constant Dk of the layer of dielectric material is in a range of about 9.0 to 9.8.

Clause 43. The patch antenna of clause 42, wherein the active element and the passive element are arranged to enable the patch antenna, when electrically driven, to radiate in a band having a peak gain in a range of 24.25-29.5 GHz.

Clause 44. The patch antenna of clause 28, wherein the patch antenna is configured to radiate in a frequency band, and wherein the inner edge defining the inner opening is sized to suppress production of radiation, by the patch antenna, at a second harmonic of the frequency band.

Clause 45. The patch antenna of clause 28, further forming part of a patch antenna array.

Clause 46. The patch antenna of clause 45, wherein the patch antenna array is disposed on a substrate having a width dimension less than 3.2 mm.

Clause 47. The patch antenna of clause 46, wherein the width dimension is less than or equal to 3.0 mm.

Clause 48. A patch antenna array, comprising:
- a plurality of high-band patch antennas configured to radiate, when electrically driven, at frequencies in a relatively higher frequency band;
- a plurality of low-band patch antennas configured to radiate, when electrically driven, at frequencies in a relatively lower frequency band, the plurality of low-band patch antennas disposed in an interleaved arrangement with the plurality of high-band patch antennas, along a long axis of the patch antenna array; and
- wherein the pluralities of high-band and low-band patch antennas are disposed on a substrate having a width less than 3.2 mm.

Clause 49. The patch antenna array of clause 48, wherein the width is less than or equal to 3.0 mm.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

What is claimed is:

1. A patch antenna array, comprising:
- a plurality of high-band patch antennas configured to radiate, when electrically driven, at frequencies in a relatively higher frequency band; and
- a plurality of low-band patch antennas configured to radiate, when electrically driven, at frequencies in a relatively lower frequency band, the plurality of low-band patch antennas disposed in an interleaved arrangement with the plurality of high-band patch antennas;
- wherein each patch antenna of the plurality of low-band patch antennas includes:
  - an active element;
  - a passive element comprising a metal ring with an outer edge and an inner edge, the inner edge defining an inner opening; and
  - a plurality of peripheral, passive, metallic elements disposed around an outer edge of the active element, wherein the plurality of peripheral, passive, metallic elements are electrically isolated from the active element and from each other.

2. The patch antenna array of claim 1, wherein, in each patch antenna of the plurality of low-band patch antennas, the passive element is disposed above the active element, and wherein the outer edge of the metal ring has an overlap with an outer edge of the active element.

3. The patch antenna array of claim 1, further including a substrate on which the pluralities of high-band and low-band patch antennas are disposed, wherein adjacent high-band and low-band antennas of the patch antenna array are situated along a long axis of the patch antenna array.

4. The patch antenna array of claim 3, wherein adjacent high-band and low-band antennas of the patch antenna array are situated along the long axis with center-to-center separation in a range of about 4.0 mm to about 6.0 mm.

5. The patch antenna array of claim 1, wherein the plurality of peripheral, passive, metallic elements includes four or eight peripheral, passive, metallic elements.

6. The patch antenna array of claim 1, wherein the inner edge defining the inner opening of the metal ring of each of the low-band patch antennas is sized to suppress radiation, of the respective low-band patch antenna, at the relatively higher frequency band.

7. The patch antenna array of claim 1, wherein the inner edge defining the inner opening of the metal ring of each of the low-band patch antennas is a square edge, and wherein a length of each square edge is approximately matched to a size of active elements of each of the plurality of high-band patch antennas.

8. The patch antenna array of claim 1, wherein the inner edge defining the inner opening of the metal ring of each of the low-band patch antennas is a square edge, and wherein a length of each square edge is larger than a length of active elements of each of the plurality of high-band patch antennas.

9. The patch antenna array of claim 1, wherein the inner edge defining the inner opening of the metal ring of each of the low-band patch antennas is a circular edge, and wherein a diameter of the circular edge is approximately matched to a length of active elements of each of the plurality of high-band patch antennas.

10. The patch antenna array of claim 1, wherein the inner edge defining the inner opening of the metal ring of each of the low-band patch antennas is a circular edge, and wherein a diameter of the circular edge is larger than a length of active elements of each of the plurality of high-band patch antennas.

11. The patch antenna array of claim 1, wherein the outer edge of the metal ring and an outer edge of the active element of each of the plurality of low-band patch antennas is perfectly laterally aligned.

12. The patch antenna array of claim 1, wherein the plurality of high-band patch antennas, the plurality of low-band patch antennas, or both are further configured to radiate with dual polarizations.

13. The patch antenna array of claim 1, wherein the active element of each low-band patch antenna of the plurality of low-band patch antennas is a rectangular patch.

14. The patch antenna array of claim 13, wherein each rectangular patch is square patch, the outer edge of the square patch defining four equilateral sides of the square patch.

15. The patch antenna array of claim 1, wherein the inner edge of the metal ring of each passive element is an inner square edge.

16. The patch antenna array of claim 1, wherein each outer edge is a circular outer edge.

17. The patch antenna array of claim 1, wherein the inner edge of each metal ring is a circular inner edge.

18. The patch antenna array of claim 1, wherein the active element and the passive element of each patch antenna of the plurality of low-band patch antennas are arranged to enable the patch antenna, when electrically driven, to radiate in a band having a peak gain in a range of 24.25-29.5 GHz.

19. The patch antenna array of claim 1, wherein the pluralities of high-band and low-band patch antennas are disposed on a substrate having a width less than 3.2 mm.

20. The patch antenna array of claim 19, wherein the width is less than or equal to 3.0 mm.

* * * * *